W. C. REED.
APPARATUS FOR FORMING MASTER RECORDS FOR MUSIC SHEETS.
APPLICATION FILED SEPT. 18, 1911.

1,318,177.

Patented Oct. 7, 1919.
14 SHEETS—SHEET 1.

WITNESSES
Joseph T. Brennan.
Ernest A. Telfer

INVENTOR
Walter C. Reed,
by E. D. Chadwick,
ATTY

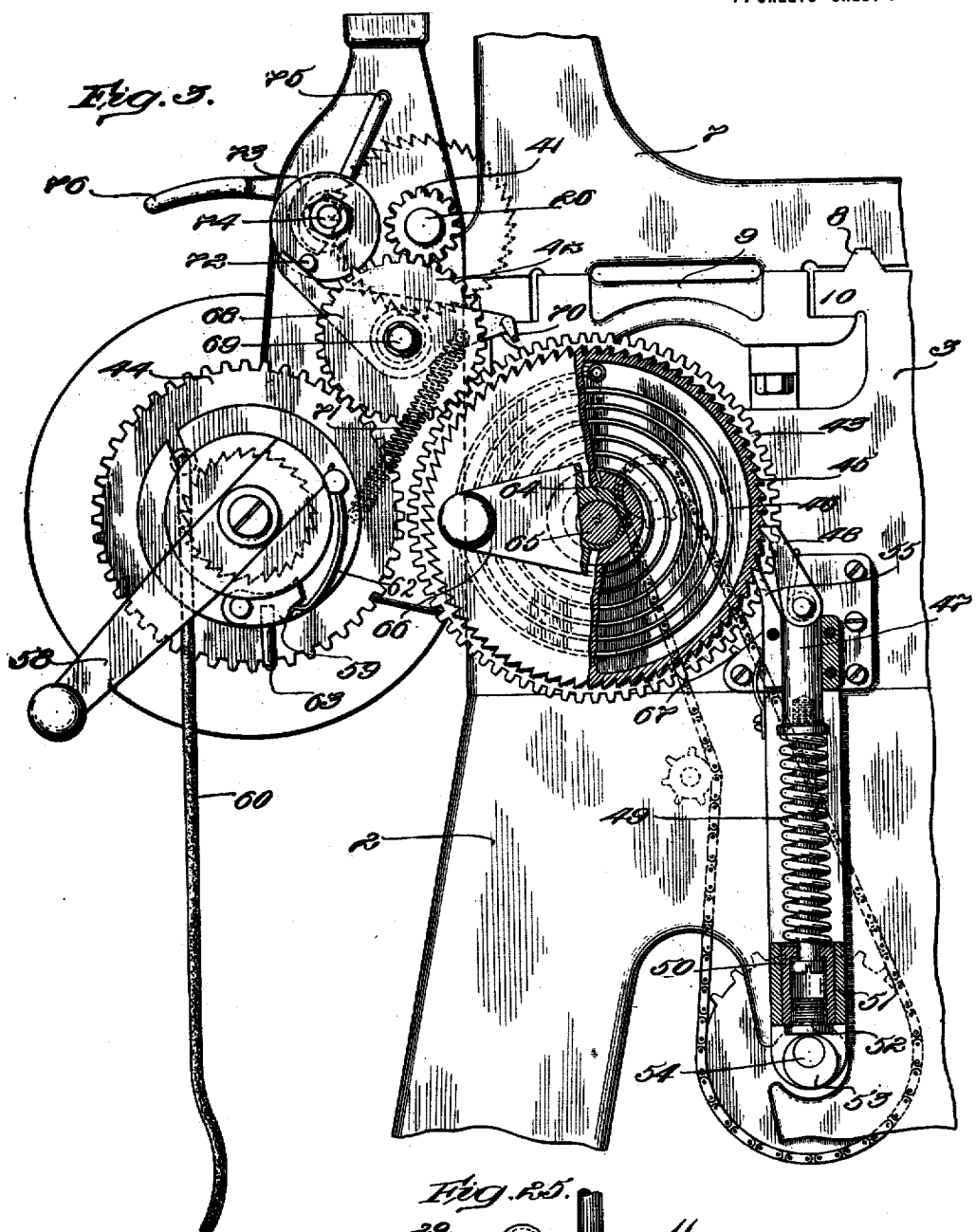

W. C. REED.
APPARATUS FOR FORMING MASTER RECORDS FOR MUSIC SHEETS.
APPLICATION FILED SEPT. 18, 1911.
1,318,177.
Patented Oct. 7, 1919.
14 SHEETS—SHEET 4.
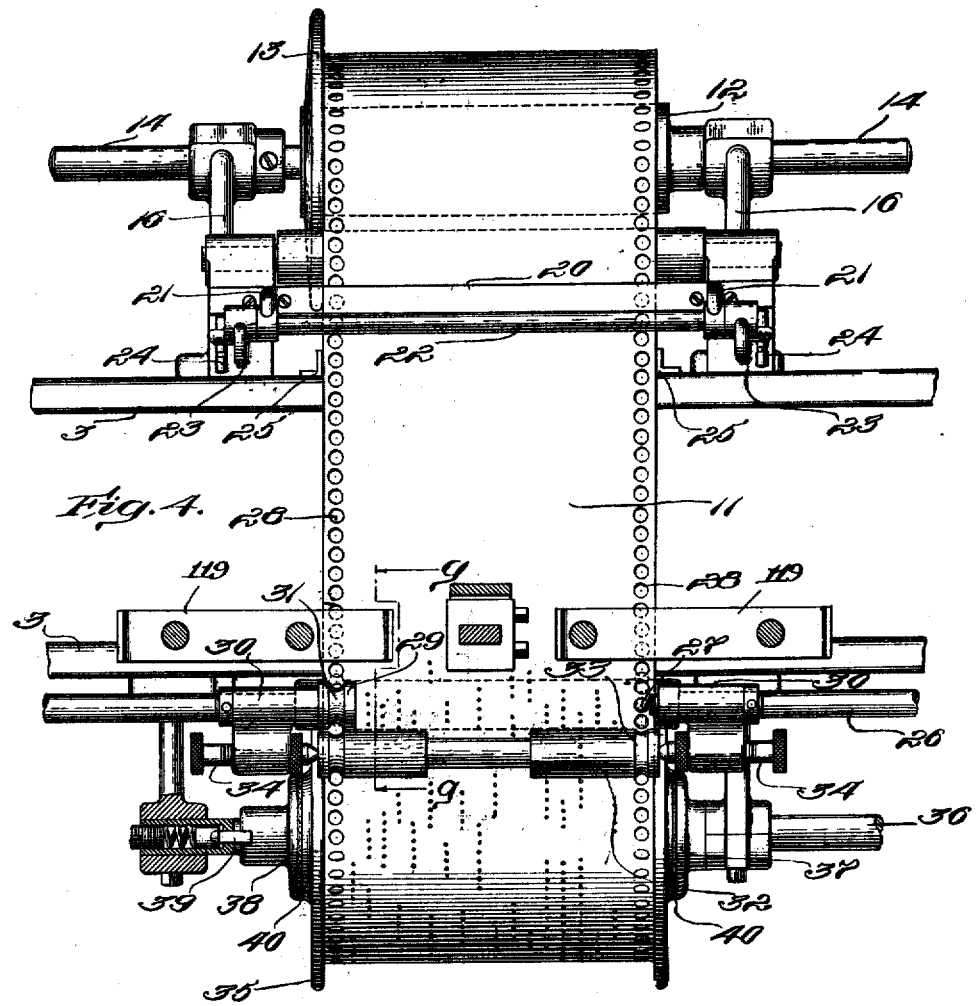

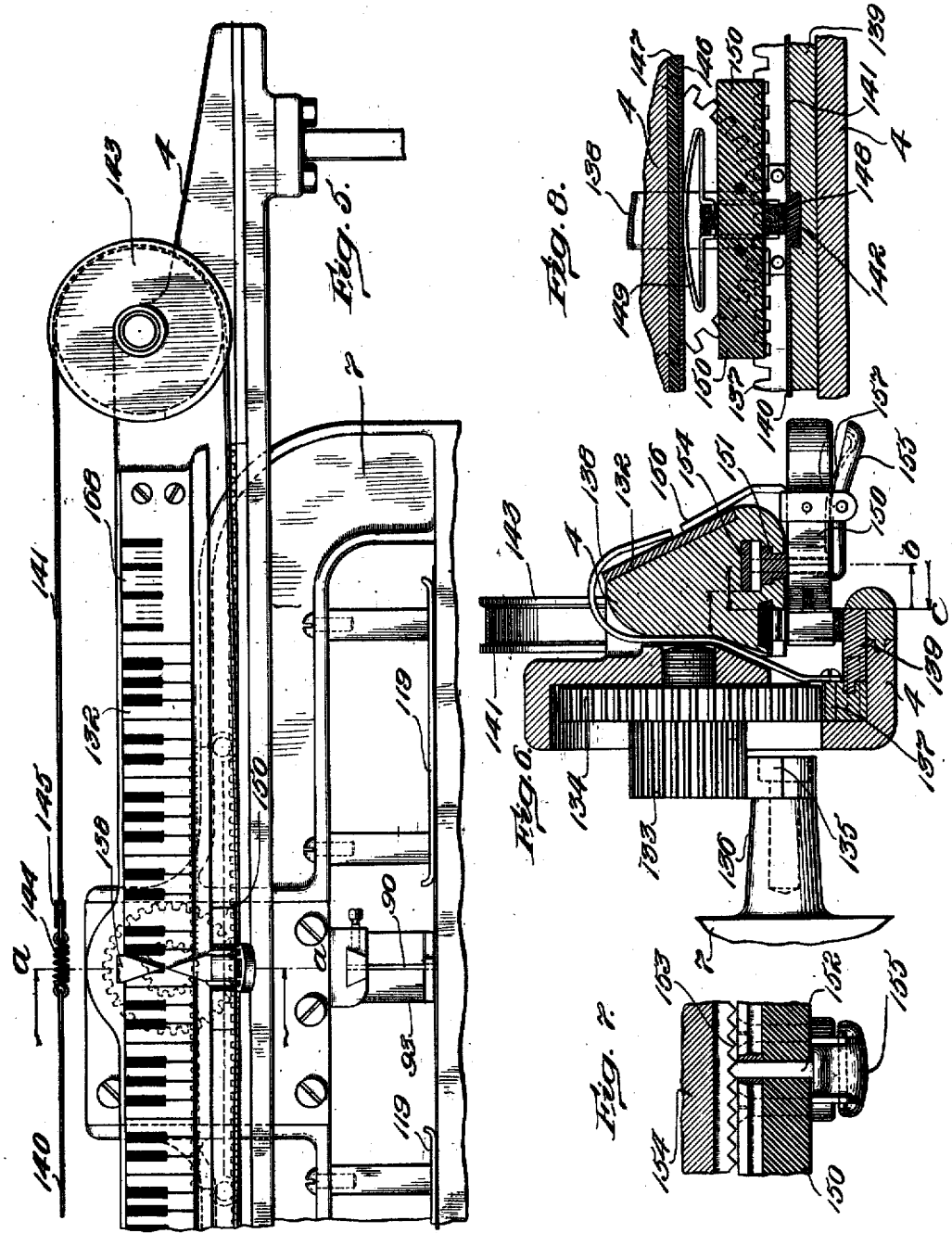

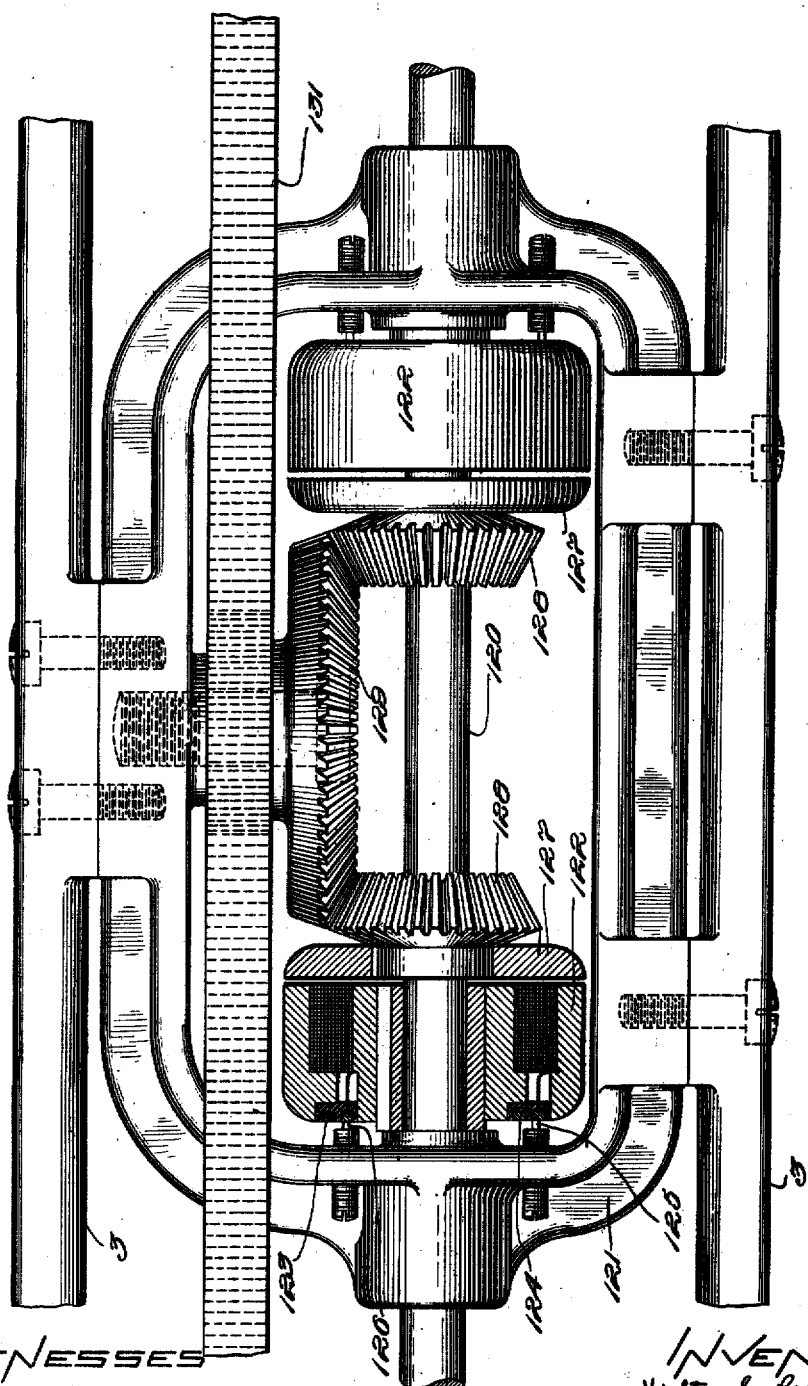

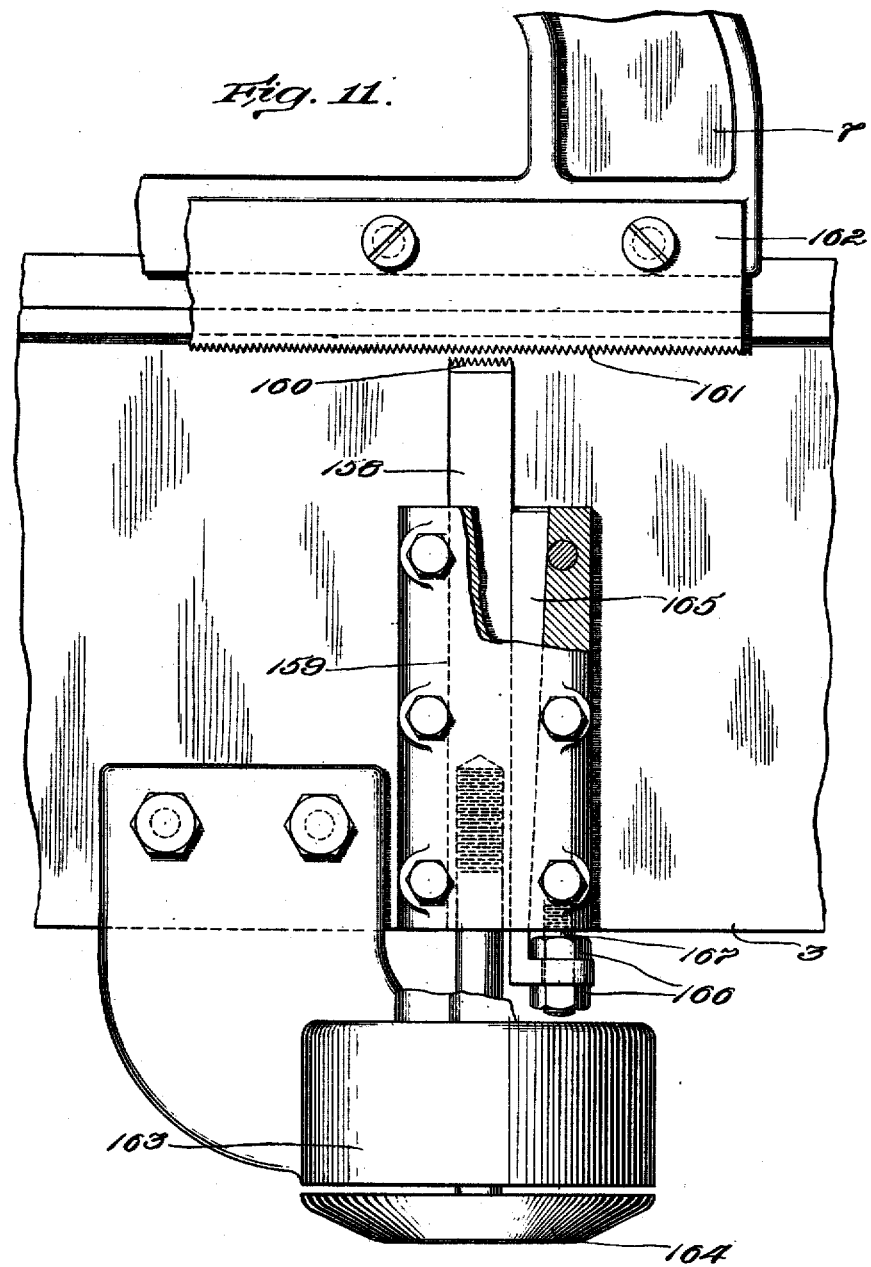

W. C. REED.
APPARATUS FOR FORMING MASTER RECORDS FOR MUSIC SHEETS.
APPLICATION FILED SEPT. 18, 1911.
1,318,177.
Patented Oct. 7, 1919.
14 SHEETS—SHEET 8.
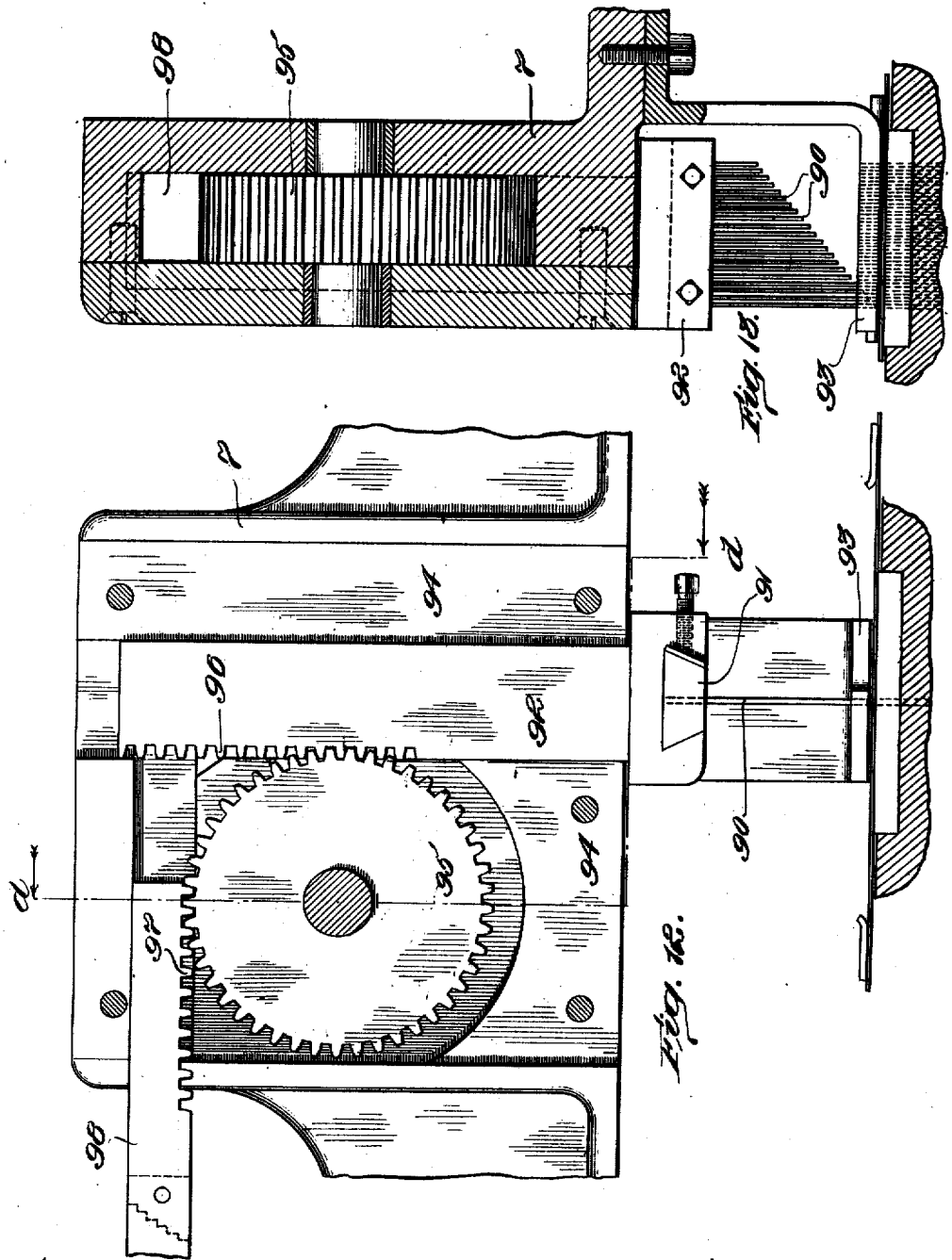

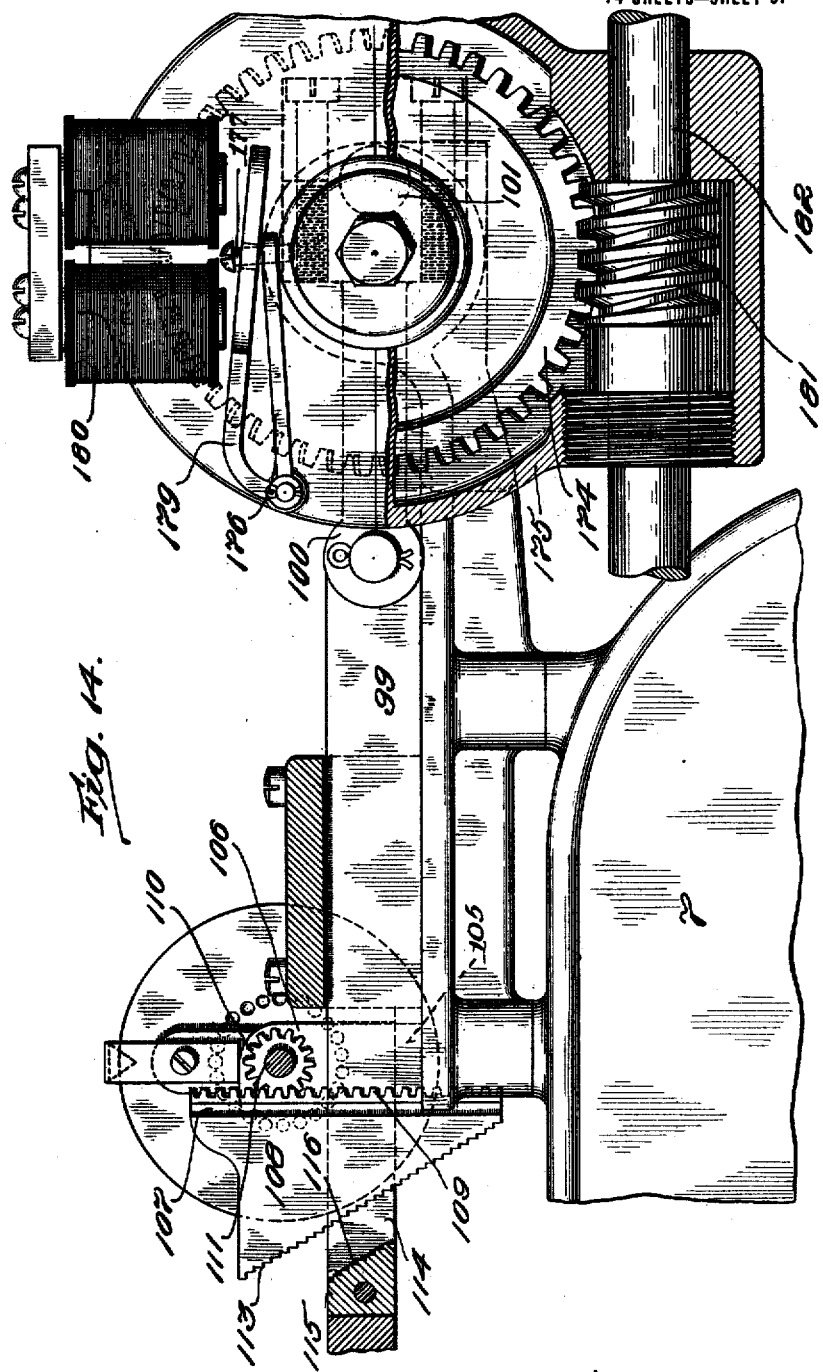

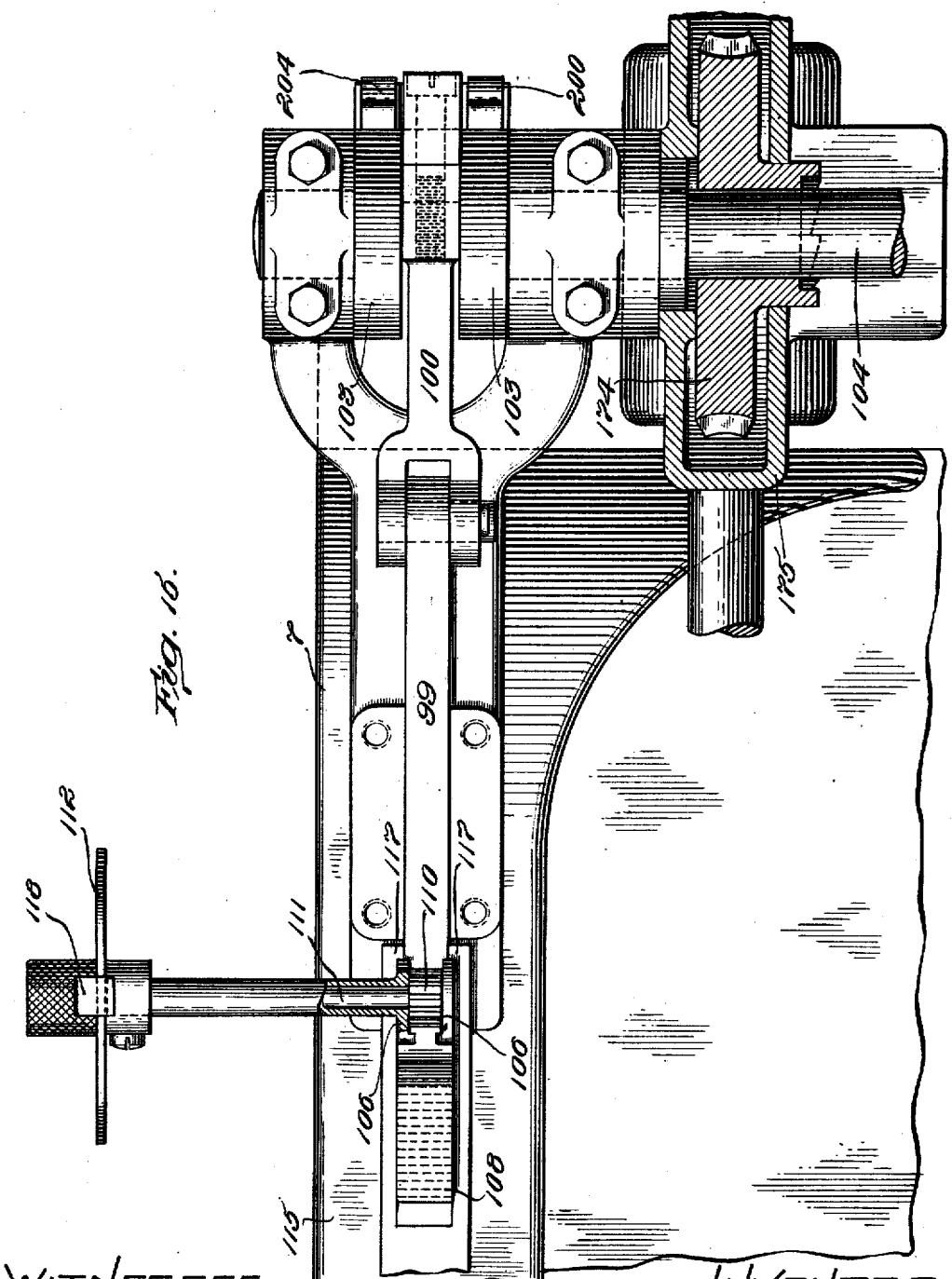

W. C. REED.
APPARATUS FOR FORMING MASTER RECORDS FOR MUSIC SHEETS.
APPLICATION FILED SEPT. 18, 1911.
1,318,177.
Patented Oct. 7, 1919.
14 SHEETS—SHEET 11.
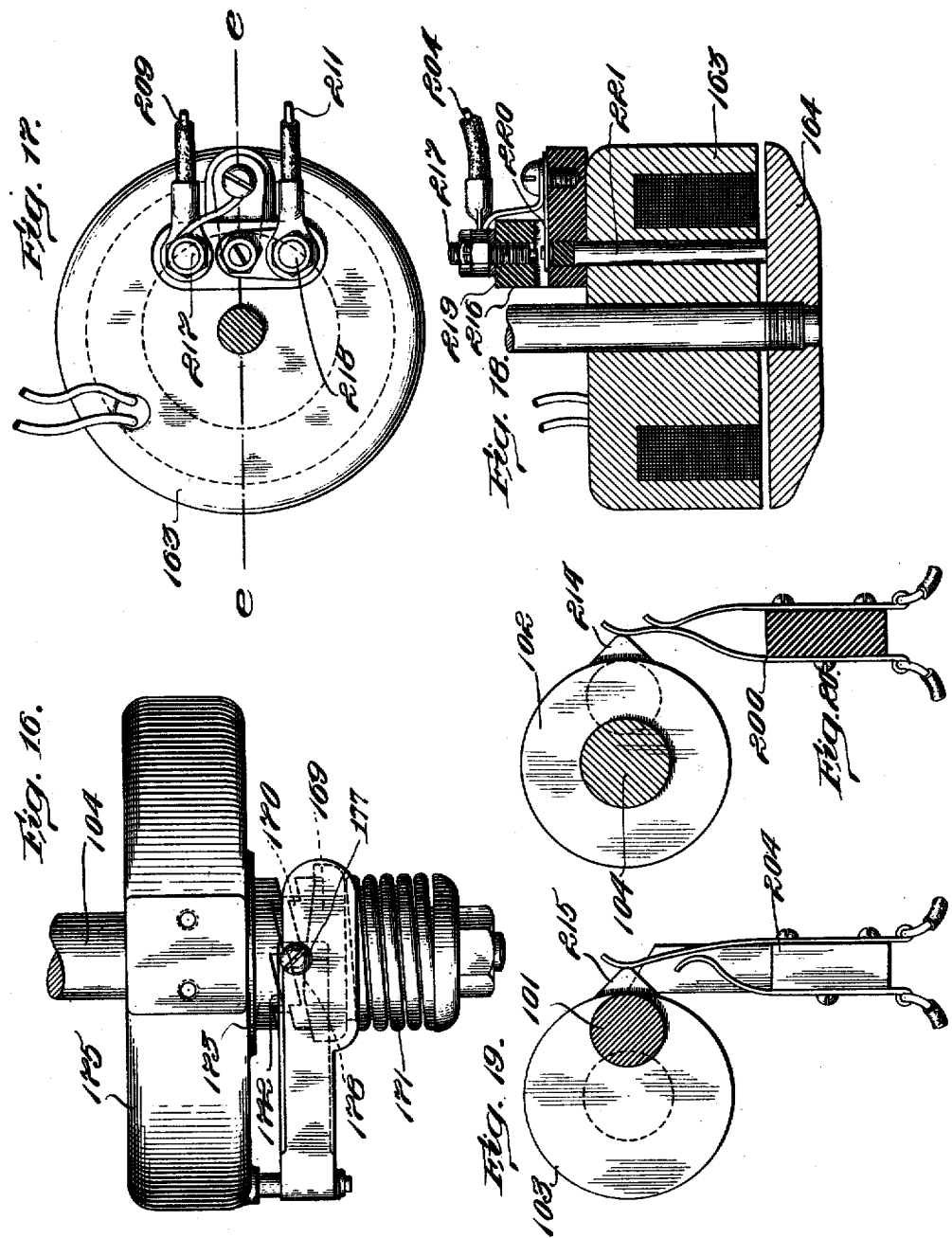

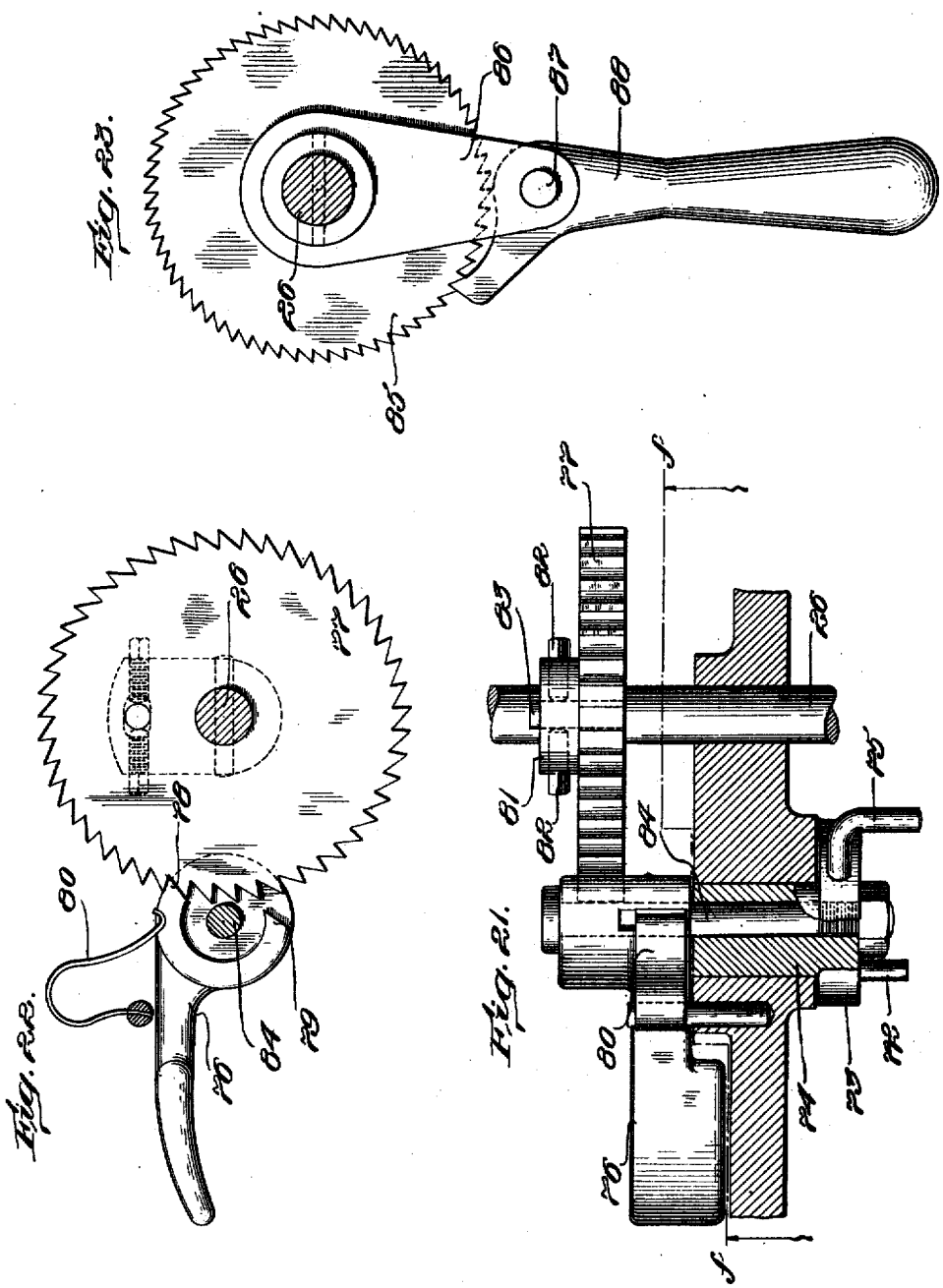

W. C. REED.
APPARATUS FOR FORMING MASTER RECORDS FOR MUSIC SHEETS.
APPLICATION FILED SEPT. 18, 1911.
1,318,177.
Patented Oct. 7, 1919.
14 SHEETS—SHEET 13.
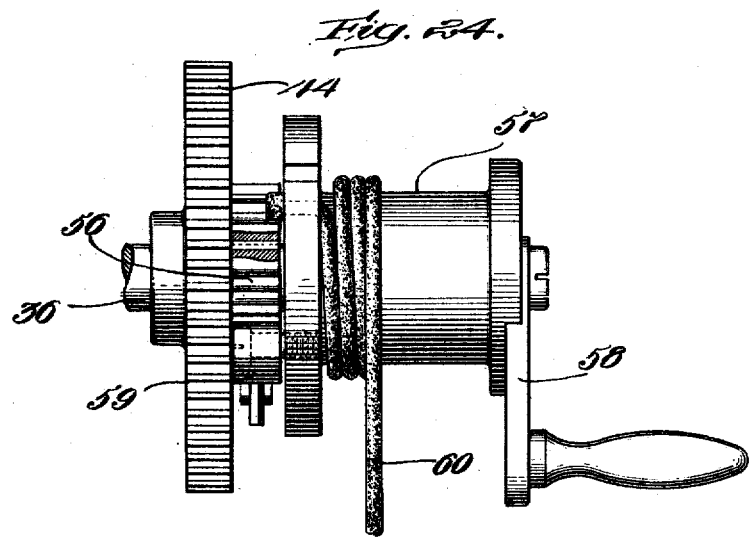
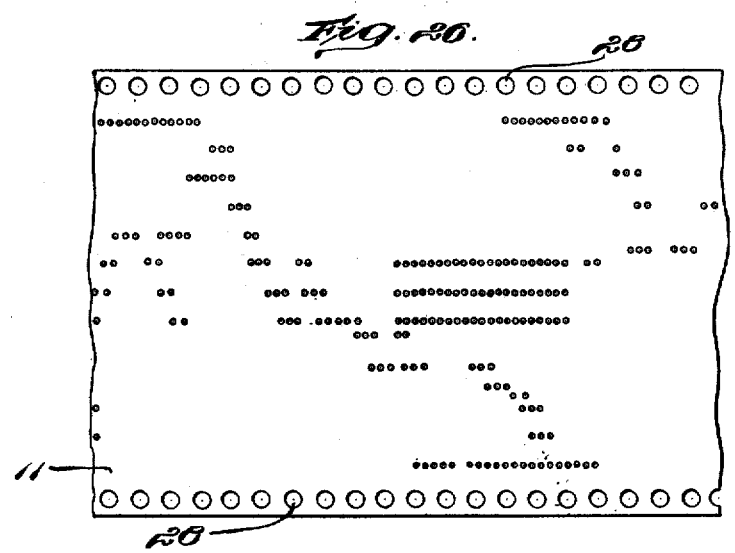

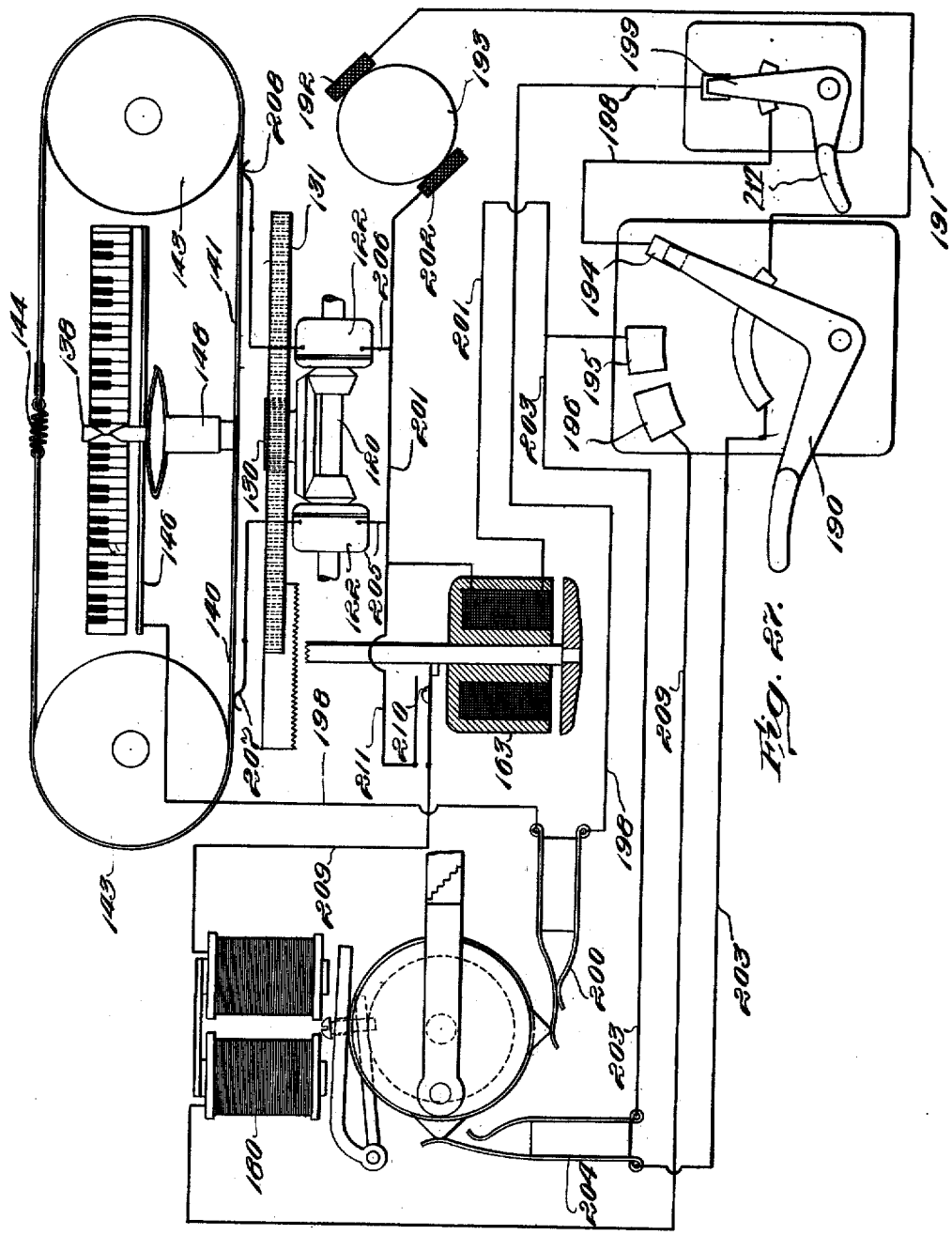

UNITED STATES PATENT OFFICE.

WALTER C. REED, OF DALTON, MASSACHUSETTS, ASSIGNOR, BY MESNE ASSIGNMENTS, TO PHILIP W. GOEWEY, OF PITTSFIELD, MASSACHUSETTS.

APPARATUS FOR FORMING MASTER-RECORDS FOR MUSIC-SHEETS.

1,318,177.     Specification of Letters Patent.     Patented Oct. 7, 1919.

Application filed September 18, 1911. Serial No. 649,976.

*To all whom it may concern:*

Be it known that I, WALTER C. REED, a citizen of the United States, residing at Dalton, in the county of Berkshire and State of Massachusetts, have invented new and useful Improvements in Apparatus for Forming Master-Records for Music-Sheets, of which the following is a specification.

In the manufacture of perforated music sheets or records such as are employed for controlling the operation of automatic playing apparatus for musical instruments it is a common practice to prepare in the first instance, in the case of any given composition, a so-called master record by the use of which, in connection with suitable duplicating apparatus, any desired number of commercial music sheets or records may be readily obtained. Such a master record, consisting of a sheet or strip of thin material provided with perforations corresponding to the notes of the composition which it represents, is formed by punching perforations in the sheet note by note, and the present invention relates particularly to apparatus for producing these records, being intended to provide an apparatus of this character which will operate rapidly and with absolute accuracy, and with a minimum expenditure of time and labor on the part of the operator. The apparatus, so far as it is automatic in its action, is preferably operated electrically, and my invention includes certain features of construction and arrangement by means of which such operation is provided for, together with various other features hereinafter set forth. These features may be embodied in various forms, but my preferred construction of the complete apparatus is illustrated in the accompanying drawings, in which:—

Fig. 3 is an end elevation, partly in section, of certain parts shown in Fig. 2, drawn on a larger scale;

Fig. 4 is a plan view of the strip on which the record is made and the parts which carry it;

Fig. 5 is a front elevation of a portion of the key-board and associated parts hereinafter described;

Fig. 6 is a cross section on the line *a—a* in Fig. 5;

Figs. 7 and 8 are detail sections taken respectively on the lines *b—b* and *c—c* in Fig. 6;

Fig. 9 is a perspective view, in detail, of the sliding index shown in Figs. 5, 6 and 7;

Fig. 10 is a plan view of the mechanism for feeding the punch carriage;

Fig. 11 is an elevation, partly in section, showing the locking device for the punch carriage;

Fig. 12 is a front elevation of the punch and connected parts;

Fig. 13 is a transverse section on the line *d—d* in Fig. 12, showing the punch in side elevation;

Fig. 14 is an end elevation, partly in section, showing the mechanism for forcing the punch through the record strip;

Fig. 15 is a plan view, partly in section, of the principal parts shown in Fig. 14;

Fig. 16 is a plan view of a clutch included in the mechanism shown in Fig. 14;

Fig. 17 is a plan view showing a portion of the mechanism for locking the punch carriage;

Fig. 18 is a section on the line *e—e* in Fig. 17;

Figs. 19 and 20 are detail views illustrating spring contacts hereinafter described;

Fig. 21 is a plan view, partly in section, showing the escapement for the strip-feeding mechanism;

Fig. 22 is a section on the line *f—f* in Fig. 20;

Fig. 23 is an elevation showing a hand-operated device for feeding the strip backward;

Fig. 24 is an elevation of a portion of the feeding mechanism hereinafter described;

Fig. 25 (on Sheet 3) is a section on the line *g—g* in Fig. 4, showing another portion of the feeding mechanism;

Fig. 26 shows a portion of a master record produced on the machine; and

Fig. 27 is a diagrammatic view showing the electric connections which control the operation of the apparatus.

Figure 1:
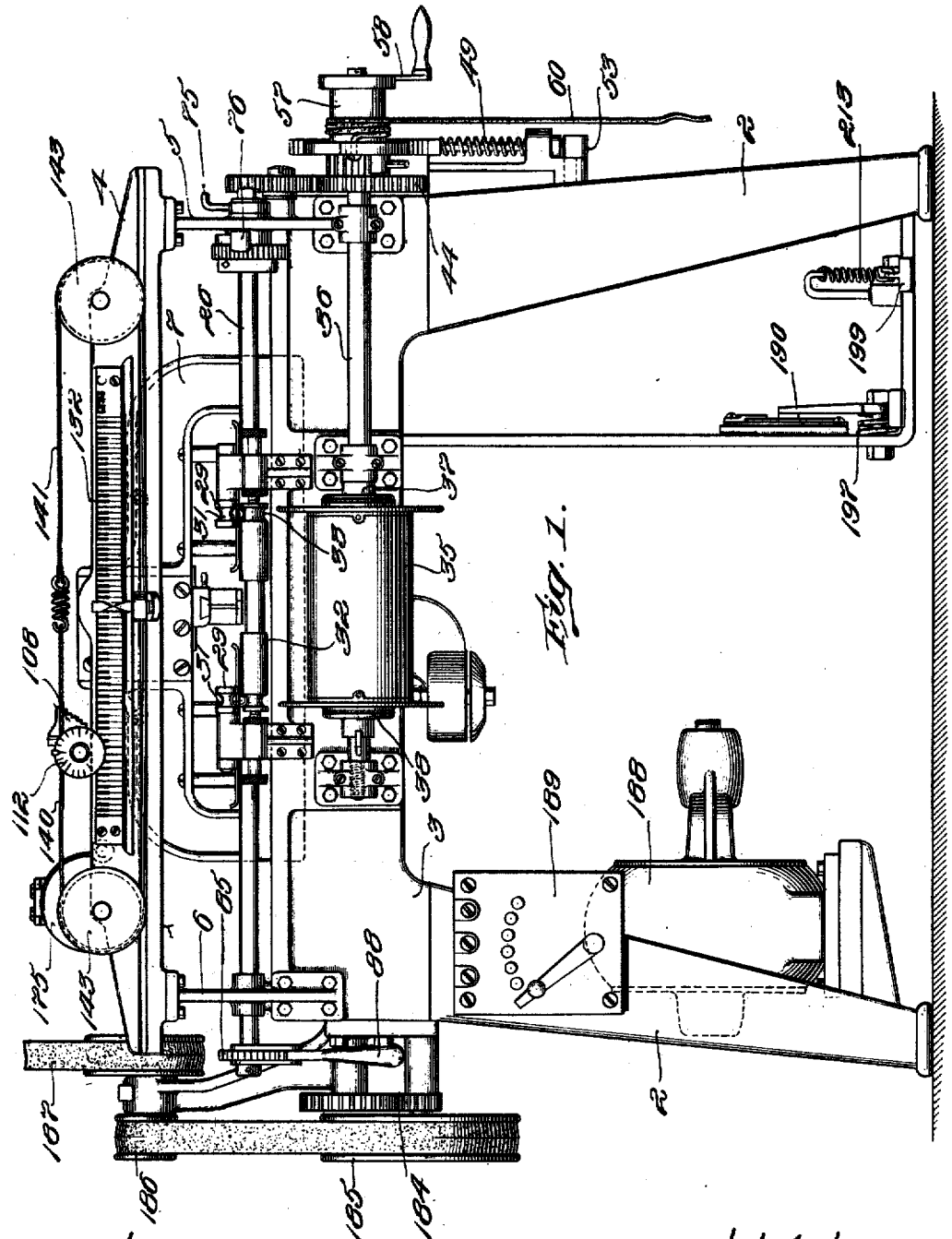
Figure 1 is a front elevation of the complete apparatus.
Figure 2:
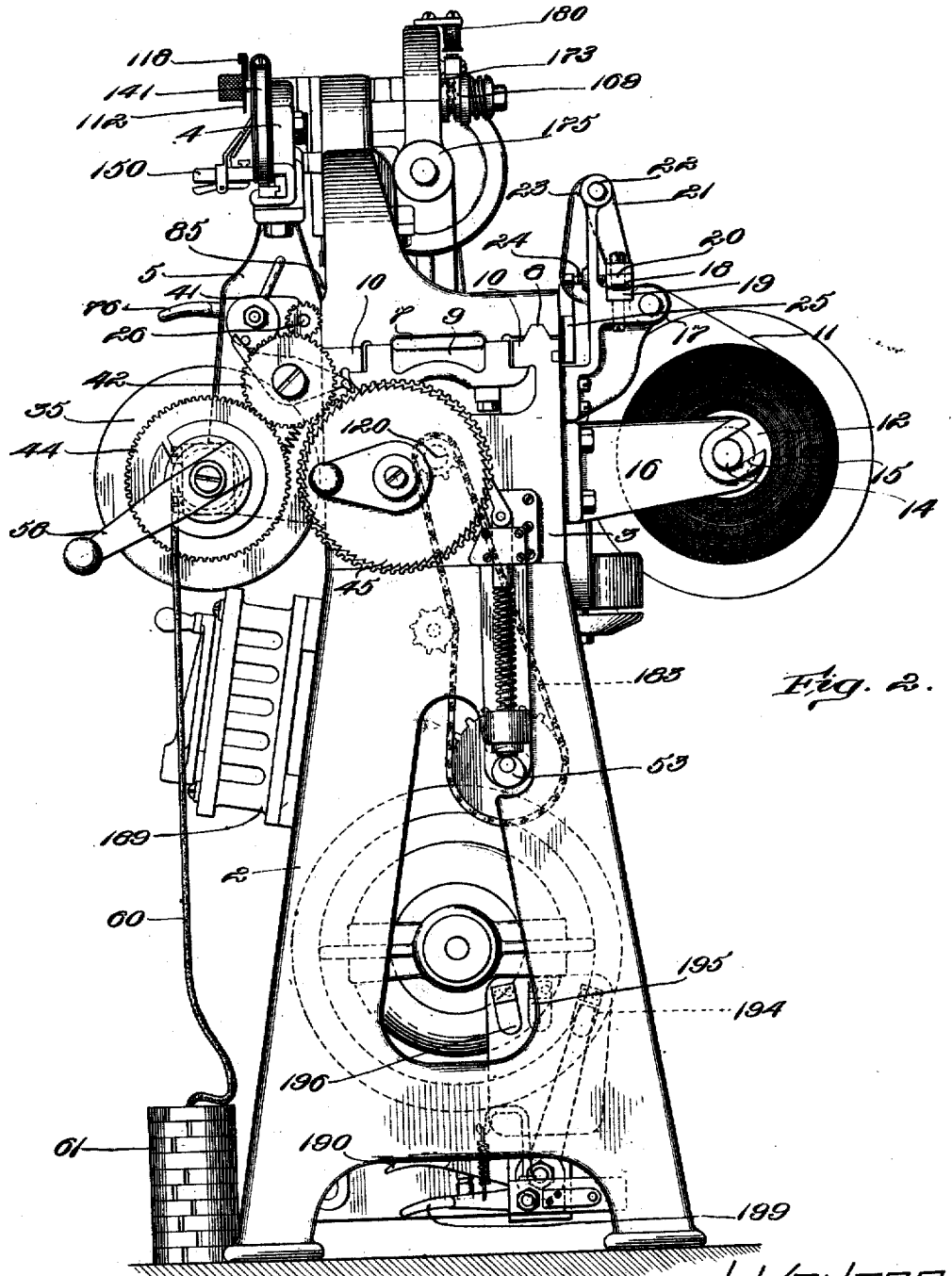
Fig. 2 is an end elevation of the same as viewed from the right hand end.

The supporting frame-work of the apparatus illustrated in the drawings comprises end uprights 2, a hollow bed 3 carried on the upper ends of the uprights 2, and a top plate 4 supported on brackets 5 and 6 secured to the bed 3. A punch carriage 7 is mounted to slide horizontally on the bed 3 in a lateral direction, being accurately guided in its sliding movements by suitable means such as a tapered guiding rib 8, which enters a correspondingly formed groove in the rear portion of the carriage as shown in Fig. 2. Clamps, such as 9, Fig. 2, which are secured to the underside of the carriage and bear against the under surface of over-hanging portions 10 of the bed 3, serve to hold the carriage 7 in close contact with the guiding rib 8. The central portion of the punch carriage is open from front to back as shown in Fig. 1, and at the bottom of this opening the carriage has a flat bed plate on the upper surface of which the strip of material to be perforated is supported during the punching operation and across which it is fed. Said strip, indicated at 11, is usually made of thin sheet brass and is introduced into the machine in the form of a coil, which is slipped onto a suitable hub 12 having a stop flange 13 at one end and provided at both ends with studs 14 adapted to rest in notches 15 formed on the outer ends of brackets 16 carried by the bed 3 at its rear side, as shown in Fig. 2, so that one of the hubs with a coiled strip thereon can be readily placed in position to rotate in the brackets 16 and the hub can be removed therefrom when empty. From the upper side of the coil the strip 11 passes over a guide roller 17 and thence between pads 18 of felt or the like, which extend across the width of the strip and are pressed upon it, thus serving to clean the same. These pads also serve as a friction brake to resist the drawing forward of the strip by the positive feeding mechanism hereinafter described, thus preventing the strip from overrunning or buckling. The lower pad 18 is carried by a suitable fixed support 19, while the upper pad is carried by a bar 20 secured to the lower ends of arms 21 which are fixed to a rod 22 pivotally mounted in the upper ends of brackets 23 carried by the bed 3, the arrangement being such that the arms 21 and bar 20 can be swung backward and upward to free the strip 11 from the grip of the pads 18. These pads are normally drawn together by their frictional engagement with the strip 11 as it passes between them, whereby they are caused to exert a firm pressure thereon, and this pressure is regulated by adjustable stops 24 so located as to engage the bar 20 and limit its downward and forward movement.

After leaving the pads 18 the strip 11 passes between fixed edge guides 25, whereby the direction of its movement is accurately preserved, and from these guides 25 it passes over the flat bed plate of the carriage 7 to the front of the machine and thence to a feeding device consisting of a shaft 26 having formed thereon two circumferential rows of hemispherical projections 27, which are of such size and are so spaced, both circumferentially and with respect to the length of the shaft 26, that when said shaft is rotated the projections in each row will successively enter and fit circular perforations 28 extending in series along the corresponding margin of the strip 11, these perforations being formed before said strip is coiled up and placed upon the hub 12. The perforated margins of the strip 11 are held in contact with the top of the shaft 26 by means of two pressure rolls 29 journaled in fixed brackets 30, which are located on opposite sides of the strip and in front of the bed plate 3, each roll being provided with an annular groove 31 to receive the corresponding projections 27. Another pressure roll 32, having similar annular grooves 33 at its ends to receive the projections 27, is journaled directly in front of the shaft 26 on pins 34, which enter the ends of the roll 32 and have a screw-threaded connection with the respective brackets 30, so that they may be separated to permit the removal of the pressure roll 32, between which and the shaft 26 the strip 11 passes. Said strip is thus held in close contact with about a quarter of the circumference of the shaft 26, so that a positive feeding engagement between the projections 27 and the perforated margins of the strip is secured.

After leaving the shaft 26 the strip 11 is wound up on a drum 35, which is rotatably mounted on a shaft 36 journaled on the front of the bed 3 and driven as hereinafter described. At the ends of the drum 35 disk-like heads 37 and 38 are mounted on the shaft 36, of which the head 37 is fixed to the shaft, while the head 38 is adapted to slide longitudinally on said shaft, toward and away from the drum 35, but is normally pressed toward the drum and compelled to rotate with the shaft by means of a spring-pressed sliding key 39 entering a notch in said head, as shown in Figs. 1 and 4, and friction disks 40 are interposed between said heads and drum so that the latter is driven frictionally when the shaft 36 is rotated. Said shaft is driven fast enough to cause the drum 35 to take up the strip 11 as fast as it passes the feed shaft 26 at the beginning of the formation of the record, and as the perforation of the strip progresses and the diameter of the coil on the drum 35 increases enough slip occurs between the drum and the heads 37 and 38 to permit said drum to rotate at a correspondingly reduced speed, the friction between the heads and drum being insufficient to impose such a strain upon the strip 11 as might tear or otherwise injure it. After the record has been completed it is drawn backward through the machine by rewinding it on the hub 12, which is then removed, the shaft 26 being allowed to rotate freely during the rewinding operation as hereinafter explained.

The mechanism employed for rotating the feed shaft 26 is illustrated in Fig. 2, in which said shaft is shown as provided at one end with a pinion 41 meshing with a gear 42 journaled on the framework of the machine and meshing in turn with two gears 43 and 44, of which the gear 43 is journaled concentrically with a ratchet wheel 45. This ratchet wheel is made hollow and contains a coiled spring 46, one end of which is secured to the hub of said ratchet wheel while its other end is secured to the gear 43, so that if said spring is kept under suitable tension the gear 43 will be rotated thereby and will rotate the feed shaft 26 whenever such movements are permitted. The spring 46 is wound up to give it the required tension by means of a rod 47 mounted to slide vertically in suitable bearings and provided at its upper end with a spring-actuated pawl 48 adapted to engage the teeth of the ratchet wheel 45. Between its ends said rod 47 is provided with a coil spring 49, the upper end of which bears against the under side of a shoulder formed on said rod, while the lower end of the spring rests upon the top of a hollow plunger 50 mounted to slide in a fixed bearing 51 in the direction of the length of the rod. The lower end of said rod passes through the upper end of the plunger 50 and into the hollow interior thereof, and at its lower end said plunger is provided with a vertically-adjustable bearing plate 52, which rests upon the periphery of an eccentric 53 secured to the end of a shaft 54 which is positively and continuously rotated. A second spring-actuated pawl 55, which is mounted on a fixed support and engages the teeth of the ratchet wheel 45, serves to lock said ratchet wheel against backward movement. As thus constructed, the continuous rotation of the shaft 54 and eccentric 53, acting through the plunger 50 and spring 49, causes the rod 47 to reciprocate vertically and impart a step-by-step rotation of the ratchet wheel 45 so long as the back pressure exerted on the pawl 48 by the spring 46 is insufficient to neutralize the upward pressure exerted on the rod 47 by the spring 49, which spring 49 is compressed as the plunger 50 moves upward. As soon as the spring 46 has been wound up sufficiently to enable it to apply the desired amount of power to the feed shaft 26, however, its tension will also be such as to neutralize the pressure of the spring 49 when compressed by the upward movements of the plunger 50, and thereafter said plunger will simply move upward and downward against the pressure of the spring 49, without moving the rod 47, until the spring 46 has been relaxed by the rotation of the feed shaft 26, whereupon the rod 47 will become operative again, said spring 46 being thus kept wound up to the required tension at all times by the automatic operation of the mechanism above described. This tension may be varied by adjusting the bearing plate 52 upward or downward with respect to the plunger 50.

The gear 44 is rigidly secured to the shaft 36, so that whenever the feed shaft 26 is rotated the drum 35 is also rotated and caused to take up the strip 11 as previously explained. Said gear 44 has fixed to it a ratchet wheel 56, and a drum 57 is mounted to turn on the adjacent end of the shaft 36 and is provided with an operating handle 58 and with a spring pawl 59 adapted to engage the teeth of said ratchet wheel, as shown in Figs. 3 and 24. To said drum 57 is secured one end of a cord 60 to the lower end of which is attached a weight 61, Fig. 2, and if said cord is wound up on the drum by turning the handle 58 and the ratchet wheel 56 is engaged by the pawl 59, the weight 61 acting through the drum and ratchet will tend to turn the gear 44 in the same direction as that in which the gear 43 is rotated by the spring 46, and will therefore have a like effect on the gear 42. The parts just described serve as a supplementary means for rotating the feed shaft 26 in case the gear 43 and its associated parts get out of repair or adjustment, and said parts are rendered inoperative at other times by throwing the pawl 59 out of engagement with the ratchet wheel 56 and into the position shown in Fig. 3, in which position it is held by the engagement of the free end of its actuating spring 62 with a shoulder on the pawl. A pin 63, secured to the pawl, provides for manipulating it as desired.

So long as the pawl 59 is out of engagement with the ratchet wheel 56 the weight 61 will rest upon the floor, as shown in Fig. 2, and will therefore be inoperative, and the drum 57 will remain stationary while the shaft on which it is journaled is rotated by the gears 42 and 44. When it is desired to utilize the weight 61 and drum 57 for actuating the shafts 26 and 36 the gear 43 is thrown out of engagement with the gear 42, and this is accomplished by journaling said gear and also the ratchet wheel 45 on a bushing 64 which is itself journaled eccentrically on a fixed stud 65 secured to the framework of the machine and is provided with an operating handle 66. By imparting to the eccentric bushing 64 a half rotation from the position shown in Fig. 3, the gear 43 will be moved directly away from the gear 42 until said gears are disengaged from each other, and simultaneously a fixed projection 67 located near the pawl 55 will enter between two teeth of the gear 43 and lock the same against rotation while in this position of adjustment, thus preventing said gear 43 from being freed entirely from restraining influences, in which case it would be rotated by the spring 46 until said spring had unwound itself. This spring 46 is thus kept wound up and ready to perform its intended function as soon as the gears 42 and 43 are again thrown into engagement with each other.

In addition to the provision above described for locking the gear 43 against backward movement, it is desirable under certain circumstances, as hereinafter described, to provide additional means for preventing rotation of said gear, and to this end I provide a lever 68 which is pivotally mounted on the stud 69 which carries the gear 42 and has at one end a projection 70 to enter between two teeth of the gear 43 when permitted to do so and thus lock said gear against rotation. A spring 71 tends to throw the projection 70 into engagement with the teeth of the gear 43. The opposite end of the lever 68 bears against a pin 72 carried by a disk 73, which disk is secured to a stud 74 journaled in the framework of the machine, as shown in Fig. 21, and is provided with an operating handle 75, the arrangement being such that when the parts are in the position shown in Fig. 3 the projection 70 is held out of engagement with the gear 43, while if the handle 75 is moved to the left from the position shown in Fig. 3, the pin 72 will tend to move away from the adjacent end of the lever 68 and the spring 71 will thereupon cause the projection 70 to lock the gear 43 against rotation as above described.

The rotation of the feed shaft 26 is controlled by a pivotally-mounted, hand-operated lever 76 coöperating with a ratchet wheel 77 secured to said shaft, as shown in detail in Fig. 22. Said lever is provided with two tooth-engaging projections 78 and 79 located on opposite sides of its pivotal axis and so arranged that before either projection can be wholly disengaged from a tooth of the ratchet wheel 77 the other projection will pass in front of another tooth of said wheel and thus serve as a stop to limit the movement of the wheel under the influence of the mechanism which constantly tends to rotate the feed shaft 26. The hand lever 76 with its two projections and the ratchet wheel 77 thus form a species of escapement adapted to permit a step-by-step rotation of the feed shaft 26, but effectively preventing any uninterrupted rotation of the same. A spring 80 normally holds the lever 76 in the position shown in Fig. 22, in which its uppermost projection 78 is in engagement with a tooth of the ratchet wheel 77, so that whenever the operator depresses the outer end of said lever and then releases the same one tooth of the ratchet wheel will pass the projection 78 and the strip 11 will be correspondingly advanced by the feed shaft 26, the parts being so proportioned that the minimum movement thus imparted to the strip 11 will represent the shortest possible interval between two successive notes of a composition as represented on said strip. Adjustment of the feed shaft 26 with respect to the lever 76 which controls its rotation is provided for by rigidly securing to said shaft, adjacent to the ratchet wheel 77, a block 81 having two adjusting screws 82 threaded into it from its opposite edges and bearing at their inner ends against the opposite sides of a pin 83 carried by the ratchet wheel 77, which wheel is otherwise free to turn on the feed shaft 26. By turning the screws 82 one way or the other a minute adjustment of the ratchet wheel with respect to the shaft 26 may be secured, as will be evident, the purpose of this adjustment being to compensate for wear on the tooth 78 and on the teeth of the ratchet wheel 77.

The stud 84 on which the lever 76 is pivoted is shown in Fig. 21 as carried eccentrically by the stud 74 to which the disk 73 is secured, so that by turning said disk as above described the lever 76 may be moved away from the ratchet wheel 77 until the projections 78 and 79 are both disengaged from the teeth of said wheel, the gear 43 being simultaneously locked against rotation by the projection 70, so that the rotation of the shaft 26 by the spring 46 will be prevented at this time. If now the gear 43 is shifted out of engagement with the gear 42 the feed shaft 26 will be left free to be rotated in either direction without restraint, and this arrangement is useful in case it is desired to back up the strip 11, as in case the operator has permitted it to advance beyond the position of a given note before the corresponding perforations have been formed therein, for example, and also when the punching of the strip 11 has been completed and said strip is ready to be re-wound on the hub 12 and removed from the machine. In this connection the lever 68 and its projections 70 serve as a safety device whereby it is rendered impossible to release the feed shaft 26 from the control of the escapement lever 76 without first preventing free rotation of said feed shaft by locking the gear 43 in fixed position. Conversely, it is impossible to unlock said gear 42 and subject the feed shaft to the driving influence thereof without first bringing said feed shaft under the control of the escapement mechanism.

For the purpose of imparting limited backward movements to the strip 11 I provide the feed shaft 26 with a hand-operated device for rotating it in a backward direction, which device is shown in Fig. 1 as applied to the left hand end of the shaft 26. This device consists, as shown in Fig. 23, of a ratchet wheel 85 fixed to said shaft 26, a pair of arms 86 mounted loosely on the shaft on opposite sides of the ratchet wheel 85 and connected at their free ends by a pivot 87, and a hand lever 88 mounted to turn on said pivot and provided on one side of the same with a projection 89 adapted to engage the teeth of the ratchet wheel. Said hand lever normally hangs idle on the pivot 87, as shown in Fig. 1, leaving the ratchet wheel 85 free to turn as the feed shaft 26 rotates in the forward direction, but if said hand lever is drawn forward its projection 89 will first engage said ratchet wheel and thereafter the forward movement of the lever will result in rotating the feed shaft 26 backward, which backward movement may be given any desired extent by moving the lever 88 successively backward and forward. During such backward movement of the shaft 26 the teeth of the ratchet wheel 77 will ride over the projection 72 on the hand lever 76, (if left in engagement therewith,) which projection will then act as a spring pawl and will lock the shaft 26 against forward movement at the end of the backward movement imparted to it. It will thus be seen that the arresting of said shaft 26 will always be accomplished by the hand lever 76, so that the space between the perforations representing successive notes in the strip 11 must always be exactly equal to the increment of movement imparted to said strip whenever said hand lever 76 is operated, or to some multiple of such increment.

From the foregoing description it will be apparent that either the spring 46 or the weight 61 may be utilized at any time for rotating the feed shaft 26, and that in case the spring 46 is employed for this purpose it may be rendered temporarily ineffective whenever it is desired to back up the strip 11 or withdraw it from the machine. In case the weight 61 is employed for rotating the feed shaft 26, however, it will be necessary to allow said weight to drop until it rests upon the floor before the feed shaft can be released from the restraint normally imposed upon it by the escapement lever 76, since otherwise said weight would impart a continuous rotation to the feed shaft 26 as soon as the latter was free from restraint.

The punch by means of which the strip 11 is perforated, as well as the mechanism which operates the punch, is mounted on the punch carriage 7, by the transverse movements of which said punch is shifted laterally and thus brought into any desired position over the strip 11 with respect to the width of the latter, according to the position on the key-board of the note corresponding to the perforations that are to be formed by any given operation of the punch. In a master record of the character shown in Fig. 26, each note is represented either by a single perforation or by a series of similar perforations located at equal distances apart and proportionate in number to the duration of the corresponding note, such a master record being distinguished from the duplicate records which are produced from it in this respect, that a series of perforations corresponding to a given note in the master record is reproduced in each duplicate record as a continuous slot of proportionate length. Accordingly, in the apparatus illustrated in the drawings a punch is employed which is adapted to form any desired number of the small perforations above referred to, within the necessary limits, by a single punching operation. This punch, as shown in Figs. 12 and 13, consists of a series of pins 90 located one directly behind the other and secured at their upper ends to a block 91 with the lower ends of the pins arranged at different elevations, step fashion, as shown in Fig. 13. The pins 90 thus constitute a series of small punches, each of which is adapted to form a corresponding perforation in the strip, and the number of such perforations formed by a given stroke of the punch will evidently depend upon the extent of the downward movement imparted to the punch. The block 91 is detachably secured in the lower end of a vertically movable head 92, with its pins 90 extending vertically downward therefrom, and these pins pass through corresponding perforations in an arm 93 secured to the carriage 7 and located above and close to the strip 11, and thence into alined perforations in the bed plate of the carriage. Each pin 90 is thus guided during its punching action by the corresponding perforations in the arm 93 at a point close to the work, so that lateral displacement of the lower ends of said pins is effectively prevented and the perforations produced thereby are kept in exact alinement. The head 92 slides between vertical guides 94 secured to the carriage 7 and is moved upward and downward by means of a toothed wheel 95 journaled on said carriage and meshing with a rack 96 on the head 92 and with another rack 97 on a horizontally-movable bar 98, which bar is also mounted on the carriage 7 and is provided with means for reciprocating it in a horizontal direction to rotate the wheel 95.

In order to provide for varying the extent of downward movement of the punch so as to form any desired number of perforations in the strip 11 by a single stroke of the punch, the following mechanism is employed. A bar 99 is mounted to slide horizontally in suitable guides on the punch carriage 7, as shown in Fig. 14, and is connected by a link 100 with a crank pin 101 carried by two disks 102 and 103, said disks being secured to a shaft 104 which is positively rotated as hereinafter described. The front end of the bar 99 (which is its right hand end as viewed from the front of the machine and its left hand end as seen in Fig. 14) is provided at its bottom with a horizontal extension 105 from the side edges of which rise two uprights 106 having inwardly-projecting front edges forming guides. These guides enter vertical grooves 107 formed in the sides of an abutment 108, so that said abutment is adapted to slide vertically on the guides. The rear edge of the abutment is provided with a vertical rack 109 meshing with a pinion 110, which is secured to a short shaft 111 journaled in the uprights 106 and projecting therefrom toward the front of the machine, where said shaft carries a graduated disk 112, while the front edge of said abutment is provided with a slanting series of notches 113, the horizontal distance between the vertical faces of adjacent notches being equal to the vertical distance between the lower ends of adjacent punch pins 90. The abutment 108 and the uprights 106 pass through and are adapted to move horizontally in a vertical slot 114 formed in the bar 98, and within said slot 114, and in front of the notched front edge of the abutment 108, is rigidly secured a block 115 having its rear edge provided with a series of notches 116 corresponding exactly in size and arrangement with the notches on said abutment 108. At the rear end of the slot 114 the bar 98 is provided with inwardly-extending lips 117 which pass behind the rear edges of the uprights 106.

When the parts just described are in the position shown in Fig. 14 the bar 99 is at the rearward limit of its movement, and if said bar is forced forward by the rotation of the shaft 104 the uprights 106 and the abutment 108 carried thereby will move forward with it without moving the bar 98 until the notched edge of said abutment comes in contact with the correspondingly notched edge of the block 115, whereupon the continued forward movement of the bar 99 will force the bar 98 ahead of it and thus rotate the toothed wheel 95 and force the punch through the work. The extent of the downward movement thus imparted to the punch may evidently be varied by rotating the graduated disk 112 and thereby adjusting the abutment 108 vertically, since if said abutment is moved upward it will have a greater amount of free motion before it engages the block 115 than if it is moved downward, and a correspondingly less number of pins 90 will be forced through the strip 11 in the former case than in the latter case. When the bar 99 is drawn backward again by the link 100, however, the bar 98 will always be brought back to a certain definite position, irrespective of the adjustment of the abutment, by the engagement of its inwardly-turned lips 117 by the rear edges of the uprights 106, the extent of movement of which is invariable, and all the pins 90, therefore, will be lifted above the work at the end of each return stroke, regardless of the number of said pins which have been forced through the work during that stroke. Thus by turning the graduated disk 112, the operator may control the action of the punch in such manner as to produce any given number of perforations in the strip 11 by a single operation of the punch, and in order to assist the operator in setting the disk 112 the graduations thereon are marked to indicate the length or time equivalent of various notes, in correspondence with the number of perforations which will represent the respective notes on the master record. A fixed pointer 118, secured to one of the uprights 106, shows the setting of the disk 112 at any given instant.

When the punch is withdrawn from the work, the guiding arm 93 acts as a stripper and thus prevents the strip 11 from being lifted off the bed plate of the punch carriage by the withdrawal of the punch. Flat plates 119, secured to the punch carriage 7 on opposite sides of the punch and located slightly above the bed plate of the carriage, serve to hold the edge portions of the strip 11 down upon said bed plate without interfering with the lateral movements of the carriage with respect to said strip.

An important portion of my invention relates to the means employed for shifting the punch carriage laterally and locating the same in proper position to punch the perforations in the strip 11 corresponding to a given note, this being done after the operator has set an index, hereinafter described, to indicate such note on a suitable scale. The mechanisms employed for this purpose, as well as certain other portions of the apparatus, are preferably operated electrically, and I will now describe these parts of the apparatus as preferably constructed.

Within the hollow interior of the bed 3 and beneath the punch carriage 7 a power-driven shaft 120 passes through an open frame 121 which is rigidly secured to said bed 3, as shown in Fig. 10. Within the open interior of this frame 121 said shaft 120 carries two clutches, of which one member is rigidly secured to the shaft while the other member is free to turn thereon. In the construction herein illustrated magnetic clutches are employed, that member of each clutch which is fixed to the shaft 120 consisting of an electro-magnet 122 having the terminals of its coils connected respectively to insulated metallic contact rings 123 and 124 which are concentric with the shaft 120 and have a sliding contact respectively with fixed terminals 125 and 126 to which the circuit wires hereinafter described are connected. The coöperating or loose member of each clutch, shown at 127, forms the armature of the corresponding magnet and has rigidly secured to it a bevel gear 128, both of the gears 128 being in mesh with a third bevel gear 129 which is journaled on a fixed stud carried by the frame 121 and has a pinion 130 attached to it, as best shown in the diagram, Fig. 27. This pinion 130 meshes with a downwardly-facing rack 131 carried by the punch carriage 7 at the rear thereon, and the punch carriage will therefore be moved in one direction or the other, according to which one of the gears 128 is locked to the shaft 120 by the operation of its clutch.

On the front side of the top plate 4 previously referred to is attached a fixed scale 132 consisting of a dummy key-board resembling in appearance the key-board of a piano, being marked to represent the black and white keys of a piano key-board in their proper order. On the back side of said plate 4 are located concentric pinions 133 and 134 which are secured together and journaled on a stud secured to the plate 4, these pinions being of different diameters. The smaller pinion 133 meshes with a horizontal rack 135 carried by arms 136 which are secured to and project forward from the top of the punch carriage 7, behind the plate 4, while the larger pinion 134 meshes with another rack 137 mounted to slide horizontally in a suitable guide-way formed in the lower portion of said plate 4, as best shown in Fig. 6. To the latter rack is secured a finger 138 extending upward and forward and bent down at its free end to form a pointer which moves along the scale 132 when the rack 137 is moved horizontally, such a movement of the rack 137 being produced whenever the punch carriage 7 moves, through the agency of the rack 135 and the pinions 133 and 134. The movements of the pointer, however, will be of greater extent than the corresponding movements of the punch carriage, in proportion to the ratio of the diameters of said pinions, this being desirable in order to secure a wide spacing of the lines on the scale 132 and thus facilitate the setting of the punch by the operator as hereinafter described.

To the rack 137 is attached a forwardly-projecting strip 139, which is made of insulating material and moves with the rack in a groove in the top plate 4, and to the top of said strip 139 at about its center are attached the ends of thin metallic bands 140 and 141, which are separated from each other at this point by an insulating block 142, Fig. 8. From this block said bands extend along the top of the strip 139 to and around idler wheels 143 journaled on the top plate 4 near opposite ends thereof, and after passing around said idler wheels the bands are brought together over the top plate and connected by a spring 144, whereby said bands are kept taut at all times, without interfering with their moving with the rack 137. An insulating block 145 is interposed in one of these bands at a suitable point, as shown in Fig. 5, so that said bands are wholly insulated from each other. To the plate 4, below the scale 132, is attached another metallic strip or band 146, which extends continuously from one end of the scale to the other and is insulated from the plate 4 by means of a suitable strip 147 of insulating material. The metallic strip 146 is located directly over and faces the bands 140 and 141, and between said strip and bands is located a contact piece 148 adapted to bear simultaneously upon the strip 146 and one or the other of the bands 140 and 141 and comprising a spring portion 149, whereby contact is assured in all positions of these parts. This contact piece is made of electrically conducting material and is carried by the rear end of a laterally-sliding index 150, which moves along the plate 4 below the scale 132 and is supported and guided thereon by means of a headed stud 151 mounted to slide in a suitable groove cut in the underside of said plate 4, as shown in Fig. 6. This index 150 is held in any desired position by means of a spring-actuated plunger 152 (Fig. 7) having a wedge-shaped upper end adapted to enter any one of a series of notches 153 cut in a bar 154 which is inserted in the plate 4 and extends lengthwise thereof, the distance between consecutive notches 153 being equal to the distance between the centers of consecutive key-indications on the scale 132. The plunger 152 is withdrawn from engagement with the notched bar 154 when desired by means of a thumb piece 155 carried by the index 150, which index also carries an index pointer 156 so arranged that its free end moves along the lower portion of the scale 132, and is located directly beneath the free end of the finger 138 whenever the contact piece 148 is located beneath the block 142.

The index 150 may therefore be moved laterally along the plate 4, by hand, and left with its index pointer 156 pointing at any given note on the scale 132, and if said index is left slightly out of exact position with respect to a selected note on said scale this error will be automatically corrected by means of the plunger 152, which is pressed upward by a spring 157 and will center the sliding index and bring it into exact position as said plunger is forced into its notch 153 by said spring.

The metallic strip and bands above described are so connected with the energizing circuits and with the circuits through the clutch magnets 122, as hereinafter described, that whenever the contact piece 148 bears at its lower end upon the insulating block 142, which is slightly wider than said contact piece, the circuits through both the clutch magnets will be broken and the punch carriage 7 will therefore remain at rest, but if the lower end of the contact piece is in contact with either of the bands 140 and 141 the circuit will be closed through that one of the clutch magnets which will cause the punch carriage to move in such direction as to bring the insulating block 142 under said contact piece, whereupon the circuit through the clutch magnet will be broken again and the carriage will stop. In order to locate the punch carriage in proper position to punch the perforations corresponding to any given note, therefore, it is merely necessary for the operator to move the index 150 along the scale 132 until the pointer 156 points at the desired note on said scale, whereupon the punch carriage will be caused to follow said pointer as above explained, and inasmuch as it is important to locate the punch, prior to any given punching operation, in exact alinement with all the other perforations corresponding to the same note on the key-board, as well as to preserve an exact spacing between adjacent series of perforations with respect to the width of the strip 11, I provide an arrangement which automatically corrects any inaccuracy in the setting of the punch carriage by the operation of the automatic mechanism above described. This is accomplished by means of a plunger 158 arranged to slide vertically in a guide 159 secured to the bed 3 and provided at its upper end with a series of accurately-formed notches 160 corresponding in the size and shape with other notches 161 cut in the lower edge of a plate 162 secured to the punch carriage 7 and extending lengthwise thereof, as best shown in Fig. 11. All of these notches are of the same size and the distance between the angles of consecutive notches is exactly equal to the distance between adjacent series of perforations in the strip 11, measured from the centers of the perforations, and therefore as the plunger 158 is forced upward after the punch carriage 7 has come to rest it will automatically bring said carriage into exact position by wedging it slightly one way or the other in case it has been left slightly out of position. This plunger 158 is operated by means of an electro-magnet 163 through which it passes, the armature 164 of the magnet being carried by the lower end of the plunger in such position that whenever the magnet is energized said armature and plunger will be lifted until the notched upper end of the plunger is forced into the notches 161 on the plate 162 as far as it will go. Inasmuch as any lateral variation in the position of the plunger would be reproduced in the setting of the carriage, I provide means for taking up any looseness of said plunger in its guide, said means consisting, as shown in Fig. 11, of a wedge-shaped key 165 located between one of the side edges of the plunger and a slanting face of the guide 159 in which the plunger moves, and adjusting nuts 166 mounted on a threaded stud 167 which passes through the lower end of the key, whereby said key may be forced downward and caused to crowd the plunger against the opposite side of the guide, and then locked in fixed position.

The lines shown at 168, at one end of the scale 132, correspond to the perforations which are commonly provided near one edge of a music sheet for controlling the expression of the composition.

The mechanism for rotating the shaft 104 which operates the punch is best shown in Figs. 14, 15 and 16. In Fig. 16 is shown in dotted lines a clutch member 169 mounted on the shaft 104 in such manner that it may slide freely thereon but is compelled to turn therewith, and having teeth 170 on one of its lateral faces and a spring 171 arranged to force said teeth into engagement with corresponding teeth 172 on the complementary clutch member 173, which is formed on the hub of a gear 174. This gear is mounted to turn freely on the shaft 104 and is preferably inclosed by a casing 175, as shown in Fig. 15. An arm 176, pivoted at one end to this casing, carries at its free end a screw pin 177, the lower end of which is so located as to bear laterally against a cam surface 178 formed on the clutch member 169, and this cam surface is so shaped that when the shaft 104 and the clutch member 169 approach the position which corresponds to the retracted position of the punch, said cam surface by its engagement with the laterally-immovable pin 177 will thrust said clutch member away from the complementary clutch member 173, until said members are disengaged, thus stopping the rotation of the shaft 104, and thereupon the lower end of the pin 177 will drop in front of one of the teeth 170 and act as a positive stop to lock said shaft in this position until the pin is lifted. For lifting said pin I provide a pivotally mounted arm 179, the free end portion of which serves as the armature of an electromagnet 180, fixed to the casing 175, and is provided with a perforation through which the upper portion of the pin 177 passes, as shown in Fig. 14. These parts are so arranged that whenever the magnet 180 is energized the arm 179 will be lifted, and just before it reaches the poles of the magnet it will engage the headed upper end of the pin 177 and lift the same out of engagement with the clutch member 169, whereupon the latter will be thrown into engagement with the clutch member 173 by the spring 171 and the shaft 104 will start to rotate. The circuit through the magnet 180 is thereupon broken, as hereinafter described, whereupon the pin 177 drops in front of the low part of the cam surface 178 and operates as already explained to stop said shaft at the end of one rotation thereof.

The gear 174 is positively and continuously driven by suitable connections with the source of power, such as a worm 181 mounted on a countershaft 182 and meshing with the teeth of said gear, said countershaft being driven from the main driving shaft of the machine, which is the shaft 120. This shaft drives the shaft 54 by means of a sprocket wheel and chain connection 183, Figs. 2 and 3, and is shown in Fig. 1 as connected by gearing 184 to a countershaft carrying a belt pulley 185, said pulley being belted to another pulley 186 on a countershaft to which power is applied from any convenient source through a belt 187. If desired the power for operating the machine may be taken from an electric motor 188 having a starting rheostat 189, Fig. 1, in case electric current is available, or if the machine is otherwise driven this motor may be utilized as a generator to provide the electric current used for energizing the various electromagnets and circuits.

In Fig. 27 I have shown diagrammatically my preferred arrangement of the electric circuits and circuit controlling devices used in connection with the parts above described. In this figure, 190 represents a pivotally mounted foot treadle, which is in circuit in all positions with a circuit wire 191 leading to one of the poles 192 of the source of electric energy, indicated at 193. Said treadle also makes contact with one or another of three terminals 194, 195, and 196, according to its position, being normally held by a spring 197 (Fig. 1) in contact with the terminal 194. From this terminal a circuit wire 198 leads to the strip 146 through circuit controllers 199 and 200, hereinafter described. The terminal 195 is connected to a circuit wire 201 which leads to the electromagnet 163 and thence to the other pole 202 of the source of electric energy 193, and from said circuit wire 201 a branch circuit wire 203 leads to a circuit controller 204 hereinafter described and thence to the circuit wire 191, while other branch circuit wires 205 and 206 lead respectively to the electromagnets 122 and thence to terminals 207 and 208 with which the bands 140 and 141 are in sliding contact respectively. The third terminal 196 is connected to a circuit wire 209 which leads to the electromagnet 180 and thence to a circuit controller 210, from which a circuit wire 211 leads to the circuit wire 201 between the magnet 163 and the pole 202. The circuit controllers 200 and 204 are operated by the crank disks 102 and 103, and when said disks are at rest the circuit at the controller 204 is open and the circuit at the controller 200 is closed. The circuit at the controller 210 is normally open but is closed by the operation of the plunger 158, and the circuit at the controller 199 is normally closed but may be opened at the will of the operator by pressing downward upon a treadle 212, which is restored to normal position when released by a spring 213. The details of construction of the circuit controllers 200, 204 and 210 are illustrated in Figs. 17, 18, 19 and 20. The circuit controller 200, shown in Fig. 20, consists of a pair of metallic arms carried by an insulating block and tending to separate under their own elasticity, so that they have to be positively forced into contact with each other, while the circuit controller 204, Fig. 19, is of similar construction except that its arms are arranged to spring into contact with each other when permitted to do so. These circuit controllers are operated by cams 214 and 215 carried by the crank disks 102 and 103 respectively, said cams being located one behind the other in practice, although in the diagram, Fig. 27, they are shown ninety degrees apart for the sake of clearness. When the crank disks are at rest the cam 214 holds the two arms of the circuit controller 200 in contact with each other, while the cam 215 holds the longer arm of the circuit controller 204 out of contact with its companion arm, but a slight rotational movement of said disks moves the cams out of engagement with the corresponding circuit controllers, thus opening the circuit at the controller 200 and closing the circuit at the controller 204.

The circuit controller 210, as illustrated in Figs. 17 and 18, consists of an insulating block 216 having metallic terminals 217 and 218 mounted thereon and connected to the circuit wires 209 and 211 respectively, the terminal 218 being also electrically connected to a vertically adjustable pin 219 and the terminal 217 being connected to a spring strip 220 the free end of which is located directly beneath the lower end of the pin 219 but is out of contact therewith when the parts are in their normal position illustrated in Fig. 18. A rod 221, passing through the body of the electro-magnet 163 and adapted to slide vertically therein, rests at its lower end upon the armature of said magnet and has its upper end located directly beneath the free end of the spring strip 220, so that when the magnet is energized and its armature is lifted said strip 220 is brought into contact with the pin 219 and the circuit through said parts is thereby closed, said pin being so adjusted that before the circuit is closed at this point the teeth carried by the plunger 158 engage the rack 162 and lock the punch carriage against movement.

The operation of the parts above described is as follows:—

Assuming that all the parts are at rest, in which case the various electric circuits are in the condition illustrated in Fig. 27, the operator first turns the disk 112 to a position in which the pointer 118 indicates thereon the number of note perforations which are to be formed by the next downward movement of the punch, and then moves the index 150 laterally until its pointer 156 points to that key on the scale 132 which corresponds to the note to be punched. This movement of said index brings the contact piece 148 into contact with one or the other of the bands 140 and 141, thus closing a circuit extending from the pole 202 through the circuit wire 201, one of the electromagnets 122, the band 140 or 141, the contact piece 148, the strip 146, the circuit wire 198, (the circuit at the controllers 199 and 200 being closed at this time,) the terminal 194, the treadle 190, and the circuit wire 191 leading to the opposite pole 192 of the source of electric energy. By the closing of this circuit said electromagnet 122 is energized and caused to lock its gear 128 to the shaft 120, whereupon the punch carriage 7 and the bands 140 and 141 are moved in such direction that the insulating block 142 is brought under the contact piece 148, thus breaking the circuit at this point. The punch carriage then stops, with the punch in the proper position to form the perforations coresponding to that note of the keyboard which is indicated by the pointer 156 and finger 138, which are now located one under the other. The operator then depresses the treadle 190 until its upper end makes contact with the terminal 195, whereupon the circuit through the plunger-operating magnet 163 is closed through the circuit wires 191 and 201 connected to the poles 192 and 202 respectively. This results in elevating the plunger 158 and thereby locking the punch carriage in fixed position, at the same time correcting any slight error in its setting, as previously explained. The latter portion of this movement of the plunger 158 also closes the circuit at the circuit controller 210, and thereupon the operator depresses the treadle 190 still farther and brings it into contact with the terminal 196, the terminals 195 and 196 being of such size or so located (see Fig. 2) that before the treadle passes out of contact with the terminal 195 it makes contact with the terminal 196, whereupon the circuit through the magnet 180 is closed through the circuit wires 191 and 209, the controller 210 and the circuit wire 201. This magnet thereupon lifts its armature and causes the punch to be operated as previously described, and as the crank disks 102 and 103 commence to rotate the cam 215, which normally holds the circuit-controller 204 in open circuit position, passes out of engagement with the same and thus permits the closing at this point of a circuit which includes the plunger-operating magnet 163 and is independent of the treadle 190, so that the locking of the punch carriage against lateral movement during the operation of the punch is assured. At the same time the cam 214 moves out of engagement with the circuit controller 200, thereby opening the circuit through the magnets 122 which effect the shifting of the punch carriage, so that the operator can be setting the index 150 in readiness for the next punching operation without waiting for the previous punching operation to be finished. After the crank disks 102 and 103 have completed one rotation the gear 174 is automatically unclutched from the shaft 104 and said shaft is stopped as previously described, and in the meantime the treadle 190 is elevated and the circuits are restored to their initial condition, the circuit through the magnet 163 being opened and the plunger 158 being allowed to drop at the end of the rotation of the crank disks by the opening of the circuit through the magnet 163 at the controller 204, and the circuits which include the magnets 122 being simultaneously closed at the controller 200. The controller 199 with its treadle serves as an auxiliary device by means of which the operator can instantly stop the punch carriage at any point, if desired.

In using the apparatus above described the operator follows the score of the composition to be reproduced, shifting the index 150 along the scale 132 according to the various notes of the composition and operating the lever 76 to feed the strip 11 as may be necessary to give the note perforations the proper sequence, the expression-controlling perforations being located as required by the score by setting the index at the appropriate point on the end portion 168 of the scale 132. The manual effort required of the operator is thus very slight, since the lateral movements of the punch carriage are automatically effected by the mere shifting of the easily-moved index 150, as previously explained, and inasmuch as it is possible for the operator to set the index in the position corresponding to any given note as soon as the mechanism for punching the perforations corresponding to the preceding note has been started and is going through its cycle of operations, the formation of the record may be accomplished very rapidly. So far as I am aware I am the first to produce a record-forming apparatus having these characteristics, and my broad invention is not to be regarded as limited to the particular mechanisms above described for accomplishing the desired results.

I claim as my invention:

1. In an apparatus of the character described, the combination with a punch carriage of a manually-operated index movable independently of said carriage, and power-operated means controlled by the index for moving said carriage into a position corresponding to that of said index.

2. In an apparatus of the character described, the combination with a punch carriage of a manually-operated index movable in either direction independently of said carriage, and power-operated means controlled by the index for causing the carriage to follow said index in the same direction.

3. In an apparatus of the character described, the combination of means for feeding longitudinally the strip to be perforated, a power-operated punch carriage having a punch mounted thereon and arranged to move transversely across said strip, a scale and a manually-operated index movable along the same, independently of the punch carriage, and means operative with a movement of said index for effecting a movement of the punch carriage.

4. In an apparatus of the character described, the combination of means for feeding longitudinally the strip to be perforated, a power-operated punch carriage having a punch mounted thereon and arranged to move transversely across said strip, a scale and a manually-operated index movable along the same, independently of the punch carriage, and means operative with a movement of said index for effecting a movement of the punch carriage in one direction or the other, according to the direction of movement of the index.

5. In an apparatus of the character described, the combination of means for feeding the strip to be perforated, a power-operated punch carriage having a punch mounted thereon and arranged to move transversely across said strip, a scale and a manually-operated index movable along the same, and means controlled by the position of said index for effecting a movement of the punch carriage in either direction and for stopping the same.

6. In an apparatus of the character described, the combination of means for imparting a step-by-step movement to a strip of material to be perforated, a punch carriage movable laterally with respect to said strip, a punch mounted on said carriage, means for operating said punch, a manually-operated index, and means controlled by a movement of said index for imparting a corresponding movement to the punch carriage.

7. In an apparatus of the character described, the combination with means for imparting a step-by-step movement to a strip of material to be perforated, of a punch carriage movable transversely with respect to said strip, a punch mounted on said carriage, means for operating said punch, a manually-operated index, and means controlled by a movement of said index in either direction for moving the punch carriage in a corresponding direction.

8. In an apparatus of the character described, the combination with a punch carriage of a manually-operated index, movable independently of said carriage, power-operated means controlled thereby for moving said carriage in either direction, and means for locking the carriage in fixed position at the end of its movement.

9. In an apparatus of the character described, the combination of a punch carriage, a scale, a manually-operated index movable along the same, means for automatically correcting slight errors in the setting of the index, and power-operated means controlled by the index for moving said carriage into a position corresponding to the position of the index.

10. In an apparatus of the character described, the combination of a punch carriage, a scale, a manually-operated index movable along the same, means for automatically correcting slight errors in the setting of the index, power-operated means controlled by the index for moving said carriage into a position corresponding to the position of the index, and means for automatically correcting slight errors in the stopping point of the carriage and for locking the same in fixed position.

11. In an apparatus of the character described, the combination with a power-operated punch carriage of a punch mounted thereon, punch-actuating mechanism, a carriage lock and means for operating the same, and means controlled by the carriage lock for preventing premature operation of the punch.

12. In an apparatus of the character described, the combination with a power-operated punch carriage of a punch mounted thereon, punch-actuating mechanism, a carriage lock and means for operating the same, and means operated by the punch-actuating mechanism for maintaining the carriage lock in locking position during the operation of the punch.

13. In an apparatus of the character described, the combination with a power-operated punch carriage of a punch mounted thereon, punch-actuating mechanism, a carriage lock and means for operating the same, means controlled by the carriage lock for preventing premature operation of the punch, and means operated by the punch-actuating mechanism for maintaining the carriage lock in locking position during the operation of the punch.

14. In an apparatus of the character described, the combination with a punch carriage of a manually-operated index movable independently of said carriage and an electric circuit controlled by said index and operating when closed to effect a movement of the punch carriage to a position corresponding to that of the index.

15. In an apparatus of the character described, the combination with a punch carriage of a manually-operated index, movable independently of said carriage, electric circuits operating when closed to effect corresponding movements of the punch carriage in opposite directions, respectively, and means controlled by said index for closing one or the other of said circuits.

16. In an apparatus of the character described, the combination with a punch carriage of a manually-operated index, electric circuits operating when closed to effect movements of the punch carriage in opposite directions, respectively, means operated by a movement of said index for closing one or the other of said circuits, according to the direction of movement of the index, and means for breaking the circuit thus closed when the punch carriage reaches a position corresponding to that of the index.

17. In an apparatus of the character described, the combination of a power-operated punch carriage, electric circuits operating when closed to effect movements of the punch carriage in opposite directions, respectively, contact strips included in said circuits respectively and movable with the punch carriage, a manually-operated index, a contact piece movable therewith for closing the circuit through one or the other of said contact strips, according to the direction of movement of the index, and means for breaking said circuit when the punch carriage reaches a position corresponding to that of the index.

18. In an apparatus of the character described, the combination of a punch carriage, a power-driven shaft, a pair of gears loosely mounted thereon and connections between the same and the punch carriage for moving the latter in opposite directions, respectively, and electrically-operated means for clutching either gear to said shaft, comprising electric circuits including contact strips movable with the punch carriage and separated by an insulating block, a manually-operated index, and a contact piece movable therewith and arranged to make contact with one or the other of said strips or with said insulating block.

19. In an apparatus of the character described, the combination of a punch carriage, a punch mounted thereon and means for operating the same, and means for locking the carriage in fixed position, comprising a toothed rack movable with said carriage, a plunger having teeth adapted to engage the teeth on the rack, an electro-magnet for operating the plunger, and means for opening and closing the circuit through said magnet.

20. In an apparatus of the character described, the combination with means for feeding a strip of material adapted to have parallel series of note perforations formed therein, of a punch carriage movable transversely with respect to said strip, a punch mounted on said carriage and means for operating the same, and means for locking the carriage in fixed position, comprising a rack movable with the carriage and having pointed teeth spaced in correspondence with adjacent series of perforations to be formed in the strip, a plunger having similar teeth arranged to engage the teeth on the rack, an electro-magnet for operating the plunger, and means for opening and closing the circuit through said magnet.

21. In an apparatus of the character described, the combination of a punch, a continuously driven shaft, punch-reciprocating means and clutch members for connecting the same to said shaft, electrically-controlled means for causing said clutch members to engage each other, means operated by the punch-reciprocating parts for automatically unclutching the clutch members at the end of a reciprocation of the punch, and a movable punch carriage on which the above-mentioned parts are mounted.

22. In an apparatus of the character described, the combination of a punch carriage, a rack secured thereto, a power-driven shaft, a pair of gears loosely mounted thereon, a third gear journaled on an axis extending at right angles to the shaft and meshing with both of the other gears, a pinion secured to said third gear and meshing with said rack, a manually-operated index, and means controlled thereby for clutching either of the loose gears to said shaft.

23. In an apparatus of the character described, the combination of a punch carriage, a scale, a pointer and connections between the same and the punch carriage for moving said pointer along the scale, a manually-operated index having an index pointer also arranged to move along said scale, and power-operated means controlled by the relative position of said pointers for moving the punch carriage.

24. In an apparatus of the character described, the combination with a power-operated punch carriage of a punch mounted thereon, actuating mechanism for the punch comprising an electro-magnet and an energizing circuit therefor, means for locking the carriage in fixed position, and a normally-open circuit controller included in the energizing circuit for said magnet and arranged to be closed by the locking movement of the carriage-locking means.

25. In an apparatus of the character described, the combination of a power-operated punch carriage, an electric circuit controlling the movements thereof, a manually-operated index and means movable therewith for closing said circuit, a punch mounted on the carriage, punch-actuating mechanism, and means operated by said mechanism for opening said circuit prior to the operation of the punch.

26. In an apparatus of the character described, the combination with a power-operated punch carriage of a sliding rack and connections between the same and the punch carriage for imparting to the rack movements similar to those of said carriages but of greater extent, a scale, a manually-operated index movable along the same, contact strips movable with said rack and separated by an insulating block, a fixed contact strip, a contact piece movable with the index and arranged to connect the fixed and movable contact strips, and electric circuits extending from the movable contact strips respectively to the fixed contact strip and each including means for effecting a movement of the carriage in one direction or the other.

27. In an apparatus of the character described, the combination of a punch carriage, a pair of flexible contact strips held under tension and movable with said carriage, said strips being insulated from each other, a fixed contact strip and a contact piece extending therefrom to the movable strips, a manually-operated index connected to said contact piece, and electric circuits extending respectively from the movable contact strips to the fixed contact strip and each including means for effecting a movement of the punch carriage in one direction or the other.

28. In an apparatus of the character described, the combination with a power-operated punch carriage of a manually-operated index and means controlled thereby for effecting a movement of the punch carriage in one direction or the other, a punch mounted on said carriage and comprising a series of pins having their lower ends located at progressively different elevations, means for reciprocating said punch, and means under the control of the operator for regulating the extent of its working stroke.

29. In an apparatus of the character described, the combination of a power-operated punch carriage having a rack secured thereto, a sliding rack, gears connected to each other and meshing with said racks respectively, the gear meshing with the rack secured to the carriage being of smaller diameter than the other gear, a fixed scale, a fixed contact strip, movable contact strips attached to the sliding rack and separated by an insulating block, a manually-operated index movable along said scale and having means for accurately positioning the same with respect to any division of said scale, a contact piece movable with said index in continuous contact with the fixed contact strip and adapted to make contact with either of the movable contact strips or with the insulating block between the same, and electric circuits adapted to be closed through said contact piece and said movable contact strips, respectively, and each including means for effecting a movement of the punch carriage in such direction as to bring said insulating block into contact with said contact piece.

30. In an apparatus of the character described, the combination of a punch carriage, a punch mounted thereon, a scale, a manually-operated index movable along the scale, a power-driven shaft and connections between the same and the punch carriage for operating the latter, parallel electric circuits each including means for effecting a movement of the punch carriage in one direction or the other, means movable with said index for closing said circuits, electrically-operated means for locking the punch carriage in fixed position, electrically-controlled means for effecting a stroke of the punch, and means under the control of the operator for successively closing the circuits through the carriage-locking means and the punch-controlling means.

31. In an apparatus of the character described, the combination of a power-operated punch carriage and a punch mounted thereon, a scale, a manually-operated index movable along the scale, parallel electric circuits each including means for effecting a movement of the punch carriage in one direction or the other, means movable with said index for closing said circuits, carriage-locking mechanism and punch-operating mechanism, and electric circuits controlling the operation of said mechanisms, respectively, means under the control of the operator for successively closing said circuits, a normally-open circuit controller included in the punch-actuating circuit, means operated by the carriage-locking mechanism for the circuit at said controller, and circuit-controllers operated by the punch-actuating mechanism and arranged respectively to open the circuit controlled by the index and to close a supplementary circuit through the carriage-locking mechanism during the operation of the punch.

32. In an apparatus of the character described, the combination of a punch composed of multiple elements located at different elevations with respect to the work, and means for reciprocating the punch comprising a transversely-adjustable abutment having a slanting face the position of which determines the extent of the working stroke of the punch.

33. In an apparatus of the character described, the combination of a punch comprising a series of pins having their operative ends arranged like a series of steps, a punch-operating bar, reciprocating means for the same having a lost-motion connection therewith, and means comprising a transversely-adjustable abutment having a slanting face for varying the extent of said lost-motion according to the number of pins to be forced through the work.

34. In an apparatus of the character described, the combination of a punch comprising a series of pins having their operative ends arranged like a series of steps, a punch-operating bar, an abutment having an inclined notched face with its notches arranged in correspondence with the operative ends of the punch pins, means for reciprocating said abutment toward and away from said bar, and means for adjusting said abutment transversely to the direction of its reciprocating movement.

35. In an apparatus of the character described, the combination of a punch comprising a series of pins having their operative ends arranged like a series of steps, a punch-operating bar provided with a block having an inclined series of notches arranged in correspondence with the operative ends of the punch pins, an abutment having a correspondingly notched face, means for reciprocating said abutment toward and away from the notched face of said block, and means for adjusting said abutment transversely to the direction of its reciprocating movement.

36. In an apparatus of the character described, the combination of a punch comprising a series of pins having their operative ends arranged like a series of steps, a punch-operating bar provided with a block having an inclined series of notches arranged in correspondence with the operative ends of the punch pins, an abutment having a correspondingly notched face, means for reciprocating said abutment toward and away from the notched face of said block, means for adjusting said abutment transversely to the direction of its reciprocating movement, comprising a rack carried by the abutment, a pinion meshing therewith and means for rotating said pinion, a graduated dial arranged to rotate with the pinion, and an index pointer arranged to indicate on the dial the position of adjustment of said abutment.

37. In an apparatus of the character described, the combination of a punch comprising a series of pins having their operative ends arranged like a series of steps, a punch-operating bar, a sliding bar and power-operated means for reciprocating the same, guides carried by the latter bar and extending transversely to the direction of movement thereof, an abutment mounted to slide on said guides and having its front face notched in correspondence with the operative ends of the punch pins, stops carried by the punch-operating bar in position to be engaged by the abutment, and means for adjusting said abutment on its guides.

In testimony whereof, I have hereunto subscribed my name this seventh day of September, 1911.

WALTER C. REED.

Witnesses:
E. D. CHADWICK,
JOSEPH T. BRENNAN.

Copies of this patent may be obtained for five cents each, by addressing the "Commissioner of Patents, Washington, D. C."